US012624315B2

(12) United States Patent
Smets et al.

(10) Patent No.: US 12,624,315 B2
(45) Date of Patent: May 12, 2026

(54) CONSUMER PRODUCTS COMPRISING DELIVERY PARTICLES WITH HIGH CORE:WALL RATIOS

(71) Applicant: The Procter & Gamble Company, Cincinnati, OH (US)

(72) Inventors: Johan Smets, Lubbeek (BE); An Pintens, Brasschaat (BE); Fadi Selim Chakar, Neenah, WI (US); Linsheng Feng, Menasha, WI (US); Presley Genevie Neuman, Appleton, WI (US); Robert Stanley Bobnock, Menasha, WI (US); Joana Andreia Lameiras Domingues, Brussels (BE); Raul Rodrigo-Gomez, Schaarbeek (BE)

(73) Assignee: The Procter & Gamble Company, Cincinnati, OH (US)

( * ) Notice: Subject to any disclaimer, the term of this patent is extended or adjusted under 35 U.S.C. 154(b) by 980 days.

(21) Appl. No.: 17/839,547

(22) Filed: Jun. 14, 2022

(65) Prior Publication Data

US 2022/0396750 A1 Dec. 15, 2022

Related U.S. Application Data

(60) Provisional application No. 63/210,123, filed on Jun. 14, 2021.

(51) Int. Cl.

| | |
|---|---|
| ***C11D 3/50*** | (2006.01) |
| ***A01N 25/28*** | (2006.01) |
| ***C11D 3/37*** | (2006.01) |

(52) U.S. Cl.

CPC ............ *C11D 3/505* (2013.01); *C11D 3/3761* (2013.01)

(58) Field of Classification Search

CPC ..... A01N 25/28; B01J 13/185; A61K 8/8152; A61K 8/0241; A61K 2800/654; A01P 17/00; A01P 1/00; A61Q 19/00; A61Q 13/00; C11D 17/0039; C11D 3/505; C11D 3/3761

USPC ........................................................ 512/4, 1

See application file for complete search history.

(56) References Cited

U.S. PATENT DOCUMENTS

| | | | | |
|---|---|---|---|---|
| 11,096,875 | B2 | 8/2021 | Dihora et al. | |
| 2011/0268778 | A1 | 11/2011 | Dihora | |
| 2011/0269657 | A1 | 11/2011 | Dihora | |
| 2023/0120922 | A1 * | 4/2023 | Smets | C11D 3/505 510/337 |

FOREIGN PATENT DOCUMENTS

| | | | | |
|---|---|---|---|---|
| WO | 2010084480 | A2 | 7/2010 | |
| WO | WO-2010079466 | A2 * | 7/2010 | A61Q 19/00 |
| WO | WO-2014105440 | A1 * | 7/2014 | C11D 3/505 |
| WO | WO-2020214888 | A1 * | 10/2020 | B01J 13/14 |

OTHER PUBLICATIONS

PCT Search Report and Written Opinion for;PCT/US2022/072914 dated Sep. 28, 2022,14 pages.

Anonymous: "Downy Unstopables In Wash Scent Booster Beads : Downy,Jul. 26, 2020,XP55961852,Retrieved from the Internet:brURL:a target="_blank" href="https://downy.com/en-US/fabric-softener/downy-unstopables" https://downy.com/en-US/fabric-softener/downy-unstopables/a.

* cited by examiner

*Primary Examiner* — Jessica Whiteley
(74) *Attorney, Agent, or Firm* — Carolyn S. Powell

(57) ABSTRACT

A consumer product composition that includes a population of delivery particles, where the delivery particles include a core and a polymer wall surrounding the core, the polymer wall being derived from (meth)acrylate monomers and at least one free radical initiator, and the core including a benefit agent such as perfume, where the core and the polymer wall are present in a weight ratio of from about 95:5 to about 99.5:0.5, and where the initiator is typically used at a certain level. Related methods of making and using such consumer product compositions.

18 Claims, No Drawings

CONSUMER PRODUCTS COMPRISING DELIVERY PARTICLES WITH HIGH CORE:WALL RATIOS

FIELD OF THE INVENTION

The present disclosure relates to consumer product compositions that include a population of delivery particles, where the delivery particles include a core and a polymer wall surrounding the core. The polymer wall may be derived from (meth)acrylate monomers and at least one free radical initiator, and the core includes a benefit agent such as perfume. The core and the polymer wall are present in a weight ratio of from about 95:5 to about 99.5:0.5, and typically the initiator is used at a certain level. The present disclosure also relates to methods of making and using such consumer product compositions.

BACKGROUND OF THE INVENTION

Core/shell delivery particles can be an efficient and desirable way to deliver benefit agents in a variety of consumer products. Typical delivery particles often include a polymeric wall that surrounds a core, and the core includes the benefit agent. The walls may be made from polyacrylate polymers, which can be formed from acrylate-containing monomers via free radical polymerization reactions through the use of one or more free radical initiators. Known delivery particles may have the core material and the wall material present in a weight ratio, for example, of from about 80:20 to about 90:10.

For delivery efficiency reasons, it may be advantageous to use delivery particles with relatively high loading capacities. Such particles can in theory be achieved by simply increasing the core:wall weight ratio, but in practice the resulting particles often do not perform very well. For example, as a result of having relatively reduced wall material present, the particles tend to have high rates of leakage. Further, such particles may be relatively brittle and may prematurely rupture, resulting in the release of the benefit agent at inopportune times.

Additionally, it has been found that these problems are particularly notable in delivery particles with polyacrylate walls and high core:wall weight ratios when the benefit agent in the core contains aldehyde or ketone moieties.

Curiously, leakage and/or brittleness tend not to be as problematic when similar particles are made with lower core:wall weight ratios, such as about 90:10, despite both capsules being made with the same polymeric wall material.

There is a need for consumer products comprising high capacity delivery particles that provide improved performance, particularly when the core comprises one or more benefit agents that include aldehyde and/or ketone moieties.

SUMMARY OF THE INVENTION

The present disclosure relates to consumer product compositions that include populations of delivery particles. The delivery particles are typically characterized by a relatively high core:wall weight ratio, and a particular amount of free radical initiator that is used to make the polymer wall of the particles.

For example, the present disclosure relates to a consumer product composition that includes: a population of delivery particles, where the delivery particles include a core and a polymer wall surrounding the core, where the polymer wall includes a (meth)acrylate polymer derived, at least in part, from wall monomers and at least one free radical initiator, where the wall monomers include at least 50%, by weight of the wall monomers, of (meth)acrylate monomers, where the at least one free radical initiator is present at a level of from about 15% to about 60%, by weight of the polymer wall, where the core includes a benefit agent, where the core and the polymer wall are present in a weight ratio of from about 95:5 to about 99.5:0.5; and a consumer product adjunct material.

The present disclosure also relates to a consumer product that includes: a treatment adjunct, and a population of delivery particles, where the delivery particles include a core and a polymer wall surrounding the core, where the delivery particles are obtainable by a process including the steps of: providing an oil phase including a benefit agent, the oil phase preferably further including a partitioning modifier; dissolving or dispersing into the oil phase one or more oil-soluble or oil-dispersible wall monomers, where the wall monomers include at least 50%, by weight of the wall monomers, of (meth)acrylate monomers, preferably multifunctional (meth)acrylate monomers having at least three, and preferably at least four, at least five, or even at least six radical polymerizable functional groups with the proviso that at least one of the radical polymerizable groups is acrylate or methacrylate; providing at least one free radical initiator (e.g., a first free radical initiator) in the oil phase; providing a water phase including an emulsifier or surfactant, and optionally at least one other free radical initiator (e.g., a second free radical initiator); emulsifying the oil phase into the water phase under high shear agitation to form an oil-in-water emulsion including droplets of the oil phase dispersed in the water phase; reacting the dissolved or dispersed monomers by heating or actinic irradiation of the emulsion, thereby forming a polymer wall at an interface of the droplets and the water phase, resulting in delivery particles that have a core surrounded by the polymer wall, where the free radical initiator or initiators include from about 15% to 60% by weight of the polymer wall, and wherein the core and the polymer wall are present in a weight ratio of from about 95:5 to about 99.5:0.5.

The present disclosure also relates to a method of treating a surface, where the method includes the step of contacting the surface with a consumer product composition as described herein, optionally in the presence of water.

DETAILED DESCRIPTION OF THE INVENTION

The present disclosure relates to consumer products that include delivery particles characterized by a relatively high core:wall weight ratio. The cores of the particles contain one or more benefit agents that include aldehyde and/or ketone moieties. The walls of the particles include polyacrylate polymers that are formed, in part, with at least one free radical initiator.

It has been found that the level of free radical initiator can surprisingly impact the performance profile (e.g., leakage and/or fracture strength) when forming delivery particles having a relatively high core:wall ratio, particularly when the benefit agent includes materials having aldehyde or ketone moieties. The present disclosure generally relates to making a careful selection of free radical initiator levels in order to provide preferred delivery particles.

Without wishing to be bound by theory, it is believed that the presence of aldehyde- and/or ketone-containing benefit agents can interfere with the reaction of the free radical initiator(s) with the wall monomers, thereby negatively impacting the wall's robustness. When the amount of wall monomers is relatively high, the interactions may have a relatively negligible impact on wall formation; in effect, there are plenty of monomers available to build a robust wall. However, it is believed that when the amount of wall monomers is relatively low, the aldehydes/ketones compete with the acrylate monomers for the free radical initiator, resulting in relatively poor wall formation. It is believed that the competition occurs through intermolecular interactions and temporarily radical pick-up, due to the same or similar functional groups in the materials, and higher concentrations in a high core:wall environment, That being said, it is believed that the problem of competition for the acrylate monomers cannot be overcome by simply adding a large amount of free radical initiator. For example, it has also been found that poorly performing capsules are formed when the amount of free radical initiating agent is relatively high compared to the amount of wall monomers. Without wishing to be bound by theory, it is believed that the relative excess of initiating agent leads to many simultaneous polymerization reactions, resulting in relatively short polymers and a consequently weak particle wall. Additionally or alternatively, due to the relatively high amount of initiator, there are simply fewer structural monomers to make the polymer of the polymer wall. These particles tend to be characterized by relatively low fracture strength, leading to poor performance at desired touchpoints.

The inventors have surprisingly found that selecting the proper level of free radical initiator relative to the amount of wall monomers and/or resulting wall polymer leads to polyacrylate-based delivery particles that have advantageous leakage and/or fracture strength profiles, particularly when the particles have a high core:wall weight ratio. Consumer products formulated with these delivery particles are expected to demonstrate improved olfactory performance and/or improved stability.

The delivery particles, related consumer products, and related methods are discussed in more detail below.

As used herein, the articles "a" and "an" when used in a claim, are understood to mean one or more of what is claimed or described. As used herein, the terms "include," "includes," and "including" are meant to be non-limiting. The compositions of the present disclosure can comprise, consist essentially of, or consist of, the components of the present disclosure.

The terms "substantially free of" or "substantially free from" may be used herein. This means that the indicated material is at the very minimum not deliberately added to the composition to form part of it, or, preferably, is not present at analytically detectable levels. It is meant to include compositions whereby the indicated material is present only as an impurity in one of the other materials deliberately included. The indicated material may be present, if at all, at a level of less than 1%, or less than 0.1%, or less than 0.01%, or even 0%, by weight of the composition.

As used herein "consumer product," means baby care, beauty care, fabric & home care, family care, feminine care, and/or health care products or devices intended to be used or consumed in the form in which it is sold, and not intended for subsequent commercial manufacture or modification. Such products include but are not limited to diapers, bibs, wipes; products for and/or methods relating to treating human hair, including bleaching, coloring, dyeing, conditioning, shampooing, styling; deodorants and antiperspirants; personal cleansing; skin care including application of creams, lotions, and other topically applied products for consumer use; and shaving products, products for and/or methods relating to treating fabrics, hard surfaces and any other surfaces in the area of fabric and home care, including: air care, car care, dishwashing, fabric conditioning (including softening), laundry detergency, laundry and rinse additive and/or care, hard surface cleaning and/or treatment, and other cleaning for consumer or institutional use; products and/or methods relating to bath tissue, facial tissue, paper handkerchiefs, and/or paper towels; tampons, feminine napkins; adult incontinence products; products and/or methods relating to oral care including toothpastes, tooth gels, tooth rinses, denture adhesives, tooth whitening; over-the-counter health care including cough and cold remedies; pest control products; and water purification.

As used herein the phrase "fabric care composition" includes compositions and formulations designed for treating fabric. Such compositions include but are not limited to, laundry cleaning compositions and detergents, fabric softening compositions, fabric enhancing compositions, fabric freshening compositions, laundry prewash, laundry pretreat, laundry additives, spray products, dry cleaning agent or composition, laundry rinse additive, wash additive, post-rinse fabric treatment, ironing aid, unit dose formulation, delayed delivery formulation, detergent contained on or in a porous substrate or nonwoven sheet, and other suitable forms that may be apparent to one skilled in the art in view of the teachings herein. Such compositions may be used as a pre-laundering treatment, a post-laundering treatment, or may be added during the rinse or wash cycle of the laundering operation.

As used herein, reference to the term "(meth)acrylate" or "(meth)acrylic" is to be understood as referring to both the acrylate and the methacrylate versions of the specified monomer, oligomer, and/or prepolymer. For example, "allyl (meth)acrylate" indicates that both allyl methacrylate and allyl acrylate are possible, similarly reference to alkyl esters of (meth)acrylic acid indicates that both alkyl esters of acrylic acid and alkyl esters of methacrylic acid are possible, similarly poly(meth)acrylate indicates that both polyacrylate and polymethacrylate are possible. Poly(meth)acrylate materials are intended to encompass a broad spectrum of polymeric materials including, for example, polyester poly (meth)acrylates, urethane and polyurethane poly(meth)acrylates (especially those prepared by the reaction of an hydroxyalkyl (meth)acrylate with a polyisocyanate or a urethane polyisocyanate), methylcyanoacrylate, ethylcyanoacrylate, diethyleneglycol di(meth)acrylate, trimethylolpropane tri(meth)acrylate, ethylene glycol di(meth)acrylate, allyl (meth)acrylate, glycidyl (meth)acrylate, (meth)acrylate functional silicones, di-, tri- and tetraethylene glycol di(meth)acrylate, dipropylene glycol di(meth)acrylate, polyethylene glycol di(meth)acrylate, di(pentamethylene glycol) di(meth)acrylate, ethylene di(meth)acrylate, neopentyl glycol di(meth)acrylate, trimethylol propane tri(meth)acrylate, ethoxylated bisphenol A di(meth)acrylates, bisphenol A di(meth)acrylates, digylcerol di(meth)acrylate, tetraethylene glycol dichloroacrylate, 1,3-butanediol di(meth)acrylate, neopentyl di(meth)acrylate, trimethylolpropane tri(meth) acrylate, and various multifunctional (meth)acrylates. Monofunctional (meth)acrylates, i.e., those containing only one (meth)acrylate group, may also be advantageously used. Typical mono(meth)acrylates include 2-ethylhexyl (meth) acrylate, 2-hydroxyethyl (meth)acrylate, cyanoethyl (meth) acrylate, 2-hydroxypropyl (meth)acrylate, p-dimethylaminoethyl (meth)acrylate, lauryl (meth)acrylate, cyclohexyl (meth)acrylate, tetrahydrofurfuryl (meth)acrylate, chlorobenzyl (meth)acrylate, aminoalkyl(meth)acrylate, various alkyl(meth)acrylates and glycidyl (meth)acrylate. Mixtures of (meth)acrylates or their derivatives as well as combinations of one or more (meth)acrylate monomers, oligomers and/or prepolymers or their derivatives with other copolymerizable monomers, including acrylonitriles and methacrylonitriles may be used as well.

As used herein, "delivery particles," "particles," "encapsulates," "microcapsules," and "capsules" are used interchangeably, unless indicated otherwise. As used herein, these terms typically refer to core/shell delivery particles.

For ease of reference in this specification and in the claims, the term "monomer" or "monomers" as used herein with regard to the structural materials that form the wall polymer of the delivery particles is to be understood as monomers, but also is inclusive of oligomers and/or prepolymers formed of the specific monomers.

As used herein, the terms "free radical initiator," "free radical initiating agent," "initiator," and "initiating agent" are used interchangeably, unless indicated otherwise.

Unless otherwise noted, all component or composition levels are in reference to the active portion of that component or composition, and are exclusive of impurities, for example, residual solvents or by-products, which may be present in commercially available sources of such components or compositions.

All temperatures herein are in degrees Celsius (° C.) unless otherwise indicated. Unless otherwise specified, all measurements herein are conducted at 20° C. and under the atmospheric pressure.

In all embodiments of the present disclosure, all percentages are by weight of the total composition, unless specifically stated otherwise. All ratios are weight ratios, unless specifically stated otherwise.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Consumer Product Composition

The present disclosure relates to consumer product compositions (or simply "compositions" as used herein). The compositions of the present disclosure may comprise a population of delivery particles and a consumer product adjunct material, each described in more detail below.

The consumer products compositions of the present disclosure may be useful in baby care, beauty care, fabric care, home care, family care, feminine care, and/or health care applications. The consumer product compositions may be useful for treating a surface, such as fabric, hair, or skin. The consumer product compositions may be intended to be used or consumed in the form in which it is sold. The consumer product compositions may be not intended for subsequent commercial manufacture or modification.

The consumer product composition may be a fabric care composition, a hard surface cleaner composition, a dish care composition, a hair care composition (such as shampoo or conditioner), a body cleansing composition, or a mixture thereof.

The consumer product composition may be a fabric care composition, such as a laundry detergent composition (including a heavy-duty liquid washing detergent or a unit dose article), a fabric conditioning composition (including a liquid fabric softening and/or enhancing composition), a laundry additive, a fabric pre-treat composition (including a spray, a pourable liquid, or a spray), a fabric refresher composition (including a spray), or a mixture thereof.

The composition may be a beauty care composition, such as a hair treatment product (including shampoo and/or conditioner), a skin care product (including a cream, lotion, or other topically applied product for consumer use), a shave care product (including a shaving lotion, foam, or pre- or post-shave treatment), personal cleansing product (including a liquid body wash, a liquid hand soap, and/or a bar soap), a deodorant and/or antiperspirant, or mixtures thereof.

The composition may be a home care composition, such as an air care, car care, dishwashing, hard surface cleaning and/or treatment, and other cleaning for consumer or institutional use.

The consumer product composition may be in the form of a liquid composition, a granular composition, a hydrocolloid, a single-compartment pouch, a multi-compartment pouch, a dissolvable sheet, a pastille or bead, a fibrous article, a tablet, a stick, a bar, a flake, a foam/mousse, a non-woven sheet, or a mixture thereof.

The composition may be in the form of a liquid. The liquid composition may include from about 30%, or from about 40%, or from about 50%, to about 99%, or to about 95%, or to about 90%, or to about 75%, or to about 70%, or to about 60%, by weight of the composition, of water. The liquid composition may be a liquid laundry detergent, a liquid fabric conditioner, a liquid dish detergent, a hair shampoo, a hair conditioner, or a mixture thereof.

The composition may be in the form of a solid. The solid composition may be a powdered or granular composition. Such compositions may be agglomerated or spray-dried. Such composition may include a plurality of granules or particles, at least some of which include comprise different compositions. The composition may be a powdered or granular cleaning composition, which may include a bleaching agent. The composition may be in the form of a bead or pastille, which may be pastilled from a liquid melt. The composition may be an extruded product.

The composition may be in the form of a unitized dose article, such as a tablet, a pouch, a sheet, or a fibrous article. Such pouches typically include a water-soluble film, such as a polyvinyl alcohol water-soluble film, that at least partially encapsulates a composition. Suitable films are available from MonoSol, LLC (Indiana, USA). The composition can be encapsulated in a single or multi-compartment pouch. A multi-compartment pouch may have at least two, at least three, or at least four compartments. A multi-compartmented pouch may include compartments that are side-by-side and/or superposed. The composition contained in the pouch or compartments thereof may be liquid, solid (such as powders), or combinations thereof. Pouched compositions may have relatively low amounts of water, for example less than about 20%, or less than about 15%, or less than about 12%, or less than about 10%, or less than about 8%, by weight of the detergent composition, of water.

The composition may be in the form of a spray and may be dispensed, for example, from a bottle via a trigger sprayer and/or an aerosol container with a valve.

The composition may have a viscosity of from 1 to 1500 centipoises (1-1500 mPa*s), from 100 to 1000 centipoises (100-1000 mPa*s), or from 200 to 500 centipoises (200-500 mPa*s) at 20 s and 21° C.

Additional components and/or features of the compositions, such as delivery particles and consumer product adjunct materials, are discussed in more detail below.

Populations of Delivery Particles

The consumer product compositions of the present disclosure comprise populations of delivery particles.

The composition may comprise from about 0.05% to about 20%, or from about 0.05% to about 10%, or from about 0.1% to about 5%, or from about 0.2% to about 2%, by weight of the composition, of delivery particles. The composition may comprise a sufficient amount of delivery particles to provide from about 0.05% to about 10%, or from about 0.1% to about 5%, or from about 0.1% to about 2%, by weight of the composition, of the encapsulated benefit agent, which may preferably be perfume raw materials, to the composition. When discussing herein the amount or weight percentage of the delivery particles, it is meant the sum of the wall material and the core material.

The delivery particles typically comprise a core and a polymer wall, where the polymer wall surrounds the core. As described in more detail below, the core may include a benefit agent and optionally a partitioning modifier, and the shell may comprise a (meth)acrylate polymer, which may be derived, at least in part, from wall monomers and at least one free radical initiator.

The delivery particles may be characterized by a volume-weighted median particle size from about 10 to about 100 microns, preferably from about 15 to about 60 microns, more preferably from about 20 to about 50 microns, even more preferably from about 30 to about 40 microns. Particle size is determined according to the procedure provided in the Test Method section below.

The population of delivery particles may be characterized by one or more of the following: (i) a $5^{th}$-percentile volume-weighted particle size of from about 1 micron to about 15 microns; (ii) a $50^{th}$-percentile (median) volume-weighted particle size of from about 30 microns to about 50 microns; (iii) a $90^{th}$-percentile volume-weighted particle size of from about 40 microns to about 80 microns; or (iv) a combination thereof.

The delivery particles may be characterized by a fracture strength. Fracture strength is determined according to the procedure provided in the Test Method section below. The population of delivery particles may be characterized by an average Fracture Strength (where fracture strength is measured across several capsules at the median/$d_{50}$ size of the population) of about 0.2 MPa to about 30 MPa, or about 0.4 MPa to about 10 MPa, or about 0.6 MPa to about 5 MPa, or even from about 0.8 MPa to about 4 MPa. The population of delivery particles may be characterized by an average Fracture Strength of about 0.2 MPa to about 10 MPa, or from about 0.5 MPa to about 8 MPa, or from about 0.5 MPa to about 6 MPa, or from about 0.5 MPa to about 5 MPa, or from about 0.7 MPa to about 4 MPa, or from about 1 MPa to about 3 MPa. The population of delivery particles may be characterized by an average Fracture Strength of from about 0.2 to about 10 MPa, preferably from about 0.5 to about 8 MPa, more preferably from about 0.5 to about 5 MPa. It is believed that delivery particles having an average Fracture Strength at $d_{50}$ at these levels will perform well at one or more touchpoints that are typical for a surface, such as a fabric, treated with a composition according to the present disclosure.

As described in more detail below, the delivery particles of the present disclosure comprise a core and a polymeric wall surrounding the core. Delivery particles with a high core:wall ratio can deliver a benefit agent more efficiently, requiring less wall material to deliver the same amount of benefit agent. Further, because the delivery particles have relatively high loading of benefit agent, less delivery particle material may be required for a particular composition, saving cost and/or freeing up formulation space.

The delivery particles of the present disclosure may be characterized by a core-to-polymer-wall weight ratio (also "core:polymer wall ratio," "core-wall ratio," "core:wall ratio," or even "C:W ratio" and the like, as used herein). Relatively high core:wall ratios are typically preferred to increase the delivery efficiency or relatively payload of the particles. However, if the ratio is too high, then the capsule may become too brittle or leaky and provide suboptimal performance.

As used herein, the core:polymer wall ratio is be understood as calculated on the basis of the weight of the reacted wall monomers and initiators that constitute the polymer wall, and for purposes of the calculation excludes in the calculation entrapped nonstructural materials, such as entrapped emulsifier. The calculation is based the amounts of the starting inputs, namely the input monomers and initiators. A sample core:wall polymer ratio calculation is illustrated in Example 1 below. If the amounts of starting inputs are not readily available, then the core:wall ratio is determined according to the Analytical Determination of the Core:Wall Ratio procedure provided in the Test Methods section.

A delivery particle, preferably the population of delivery particles, may be characterized by a core:polymer wall weight ratio of at least about 95:5, preferably at least about 96:4, more preferably at least about 97:3, even more preferably at least about 98:2, even more preferably at least about 99:1. A delivery particle, preferably the population of delivery particles, may be characterized by a core-to-polymer-wall weight ratio of from about 95:5 to about 99.5:0.5, preferably from about 96:4 to about 99.5:0.5, more preferably from about 96:4 to about 99:1, more preferably from about 97:3 to about 99:1, even more preferably from about 98:2 to about 99:1. The core-to-polymer-wall weight ratio may be preferably from about 95:5 to about 99.5:0.5, more preferably from about 96:4 to about 99:1, more preferably from about 97:3 to about 99:1, even more preferably from about 97:3 to about 98:2. As mentioned above, such ratios seek to balance loading efficiency with particle performance or characteristics (e.g., low leakage and/or sufficient Fracture Strength).

Components and processes related to the delivery particles of the present disclosure are described in more detail below.

A. Polymer Wall

The delivery particles of the present disclosure include a polymer wall that surrounds a core. To note, as used herein, the terms "polymer wall," "wall," and "shell" are used interchangeably, unless otherwise indicated.

The polymer wall comprises a polymeric material, specifically a (meth)acrylate polymer. The (meth)acrylate polymer is derived, at least in part, from wall monomers and at least one free radical initiator.

1. Wall Monomers

The wall monomers may comprise at least 50%, by weight of the wall monomers, of (meth)acrylate monomers. As described in more detail above, the term "(meth)acrylate monomers" is intended to include both acrylate monomers and methacrylate monomers. The wall monomers may comprise at least 60%, preferably at least 70%, preferably at least 80%, more preferably at least 90%, even more preferably at least 95%, by weight of the wall monomers, of (meth) acrylate monomers. Relatively high amounts of (meth) acrylate monomers can result in a desirable poly(meth) acrylate wall material that has desirable properties.

The (meth)acrylate monomers may be oil-soluble or oil-dispersible. Being oil-soluble or oil-dispersible facilitates convenient encapsulation processes, particularly when the benefit agent is also oil-soluble or oil-dispersible, such as a perfume oil. The (meth)acrylate monomers may be oil-soluble or oil-dispersible multifunctional (meth)acrylate monomers.

The (meth)acrylate monomers may be multifunctional (meth)acrylate monomers. The multifunctional (meth)acrylate monomers may preferably have at least three radical polymerizable functional groups, with the proviso that at least one, more preferably at least two, more preferably at least three, preferably at least four, preferably at least five, preferably at least six, more preferably exactly six, of the radical polymerizable groups is acrylate or methacrylate. The multifunctional (meth)acrylate monomers may comprise at least three, preferably at least four, preferably at least five, preferably at least six, more preferably exactly six, radical polymerizable functional groups, with the proviso that at least one of the radical polymerizable functional groups is an acrylate or methacrylate group. The one or more multifunctional (meth)acrylate monomers or oligomers may comprise from three to six, preferably from four to six, more preferably from five to six, most preferably six, radical polymerizable functional groups. It is believed that monomers comprising a relatively greater number of radical polymerizable groups result in, for example, delivery particles with more compact walls and having preferred properties, such as less leakage, compared to walls formed from monomers that have fewer radical polymerizable groups.

The radical polymerizable functional groups may be independently selected from the group consisting of acrylate, methacrylate, styrene, allyl, vinyl, glycidyl, ether, epoxy, carboxyl, or hydroxyl, with the proviso that at least one of the radical polymerizable groups is acrylate or methacrylate. Preferably, at least two, or at least three, or at least four, or at least five, or at least six of the radical polymerizable functional groups is an acrylate or methacrylate group. Preferably, the radical polymerizable functional groups are each independently selected from the group consisting of acrylate and methacrylate. It is believed that these functional groups result in delivery particles having preferred properties, such as less leakage at high core:wall ratios, compared to other functional groups.

The (meth)acrylate monomers may comprise a multifunctional aromatic urethane acrylate or a multifunctional urethane acrylate ester. Preferably, the multifunctional (meth) acrylate monomers comprise a hexafunctional aromatic urethane acrylate or a hexafunctional urethane acrylate ester.

Additionally or alternatively, the multifunctional (meth) acrylate monomers may comprise a multifunctional aliphatic urethane acrylate.

The (meth)acrylate polymer of the polymer wall may be derived from at least two different multifunctional (meth) acrylate monomers, for example first and second multifunctional (meth)acrylate monomers, each of which may preferably be oil-soluble or oil-dispersible. The first multifunctional (meth)acrylate monomer may comprise a different number of radical polymerizable functional groups compared to the second multifunctional (meth)acrylate monomer. For example, the first multifunctional (meth) acrylate monomer may comprise six radical polymerizable functional groups (e.g., hexafunctional), and the second multifunctional (meth)acrylate monomer may comprise less than six radical polymerizable functional groups, such as a number selected from three (e.g., trifunctional), four (e.g., tetrafunctional), or five (e.g., pentafunctional), preferably five. The first and second multifunctional (meth)acrylate monomers comprise the same number of radical polymerizable functional groups, such as six (e.g., both monomers are hexafunctional), although the respective monomers are characterized by different structures or chemistries.

The (meth)acrylate monomers may further comprise a monomer selected from an amine methacrylate, an acidic methacrylate, or a combination thereof.

The (meth)acrylate polymer of the polymer wall may be a reaction product derived from the multifunctional (meth) acrylate (which may preferably be oil-soluble or oil-dispersible), a second monomer, and a third monomer. Preferably, the second monomer comprises a basic (meth)acrylate monomer, and the third monomer comprises an acidic (meth)acrylate monomer. The basic (meth)acrylate monomer may be present at less than 2% by weight of the wall polymer. The acidic (meth)acrylate monomer may be present at less than 2% by weight of the wall polymer.

The basic (meth)acrylate monomer may comprise one or more of an amine modified methacrylate, amine modified acrylate, a monomer such as mono or diacrylate amine, mono or dimethacrylate amine, amine modified polyether acrylate, amine modified polyether methacrylate, aminoalkyl acrylate, or aminoalkyl methacrylate. The amines can be primary, secondary or tertiary amines. Preferably the alkyl moieties of the basic (meth)acrylate monomer are C1 to C12.

Suitable amine (meth)acrylates for use in the particles of the present disclosure may include aminoalkyl acrylate and/or aminoalkyl methacrylate including, for example, but not by way of limitation, ethylaminoethyl acrylate, ethylaminoethyl methacrylate, aminoethyl acrylate, aminoethyl methacrylate, tertiarybutyl ethylamino acrylate, tertiarybutyl ethylamino methacrylate, tertiarybutyl aminoethyl acrylate, tertiarybutyl aminoethyl methacrylate, diethylamino acrylate, diethylamino methacrylate, diethylaminoethyl acrylate diethylaminoethyl methacrylate, dimethylaminoethyl acrylate and dimethylaminoethyl methacrylate. Preferably, the amine (meth)acrylate is aminoethyl acrylate or aminoethyl methacrylate, or tertiarybutyl aminoethyl methacrylate.

The acidic (meth)acrylate may comprise, by way of illustration, one or more of carboxy substituted acrylates or methacrylates, preferably carboxy substituted alkyl acrylates or methacrylates, such as carboxyalkyl acrylate, carboxyalkyl methacrylate, carboxyaryl acrylate, carboxy aryl methacrylate, and preferably the alky moieties are straight chain or branched C1 to C10. The carboxyl moiety can be bonded to any carbon of the C1 to C10 alkyl moiety, preferably a terminal carbon. Carboxy substituted aryl acrylates or methacrylates can also be used, or even (meth) acryloyloxyphenylalkylcarboxy acids. The alkyl moieties of the (meth)acryloyloxyphenylalkylcarboxy acids can be C1 to C10.

Suitable carboxy (meth)acrylates for use in particles of the present disclosure may include 2-carboxyethyl acrylate, 2-carboxyethyl methacrylate, 2-carboxypropyl acrylate, 2-carboxypropyl methacrylate, carboxyoctyl acrylate, carboxyoctyl methacrylate. Carboxy substituted aryl acrylates or methacrylates may include 2-acryloyloxybenzoic acid, 3-acryloyloxybenzoic acid, 4-acryloyloxybenzoic acid, 2-methacryloyloxybenzoic acid, 3-methacryloyloxybenzoic acid, and 4-methacryloyloxybenzoic acid. (Meth)acryloyloxyphenylalkylcarboxy acids by way of illustration and not limitation can include 4-acryloyloxyphenylacetic acid or 4-methacryloyloxyphenylacetic acid.

When the polymer wall is derived, at least in part, from an oil-soluble or oil-dispersible (meth)acrylate monomer, the polymer wall may be further derived from a water-soluble or water-dispersible mono- or multifunctional (meth)acrylate monomer, which may include a hydrophilic functional group. The water-soluble or water-dispersible mono- or multifunctional (meth)acrylate monomer may be preferably selected from the group consisting of amine (meth)acrylates, acidic (meth)acrylates, polyethylene glycol di(meth)acrylates, ethoxylated monofunctional (meth)acrylates, ethoxylated multi-functional (meth)acrylates, other (meth)acrylate monomers, other (meth)acrylate oligomers, and mixtures thereof.

2. Free Radial Initiator

The (meth)acrylate polymer of the polymer wall may be derived from wall monomers and at least one free radical initiator. The one or more free radical initiators can provide a source of free radicals upon activation, thereby facilitating polymerization to form the wall polymer.

As described above, it has been surprisingly found that selecting a certain amount of free radical initiator in delivery particles that have a high core:wall weight ratios can provide surprisingly improved performance, for example in terms of leakage and/or fracture strength. It is believed that the relative amount of free radical initiator is particularly important in particles having high core:wall weight ratios because the relative of amount of wall monomer is so low.

In the polymer walls of the present disclosure, the at least one free radical initiator may be present at a level of from about 15% to about 60%, by weight of the polymer wall. The at least one free radical initiator is present at a level of from about 20% to about 60%, preferably from about 20% to about 50%, more preferably from about 20% to about 45%, even more preferably from about 20% to about 35%, by weight of the polymer wall.

The wall monomers, preferably the (meth)acrylate monomers, and the at least one free radical initiator may be used in a free radical polymerization reaction in a weight ratio of from about 85:15 to about 40:60, preferably from about 80:20 to about 40:60, more preferably from about 80:20 to about 50:50, even more preferably from about 80:20 to about 55:45, even more preferably from about 80:20 to about 65:35.

The (meth)acrylate polymer of the polymer wall may preferably be derived at least two free radical initiators. The (meth)acrylate polymer may be derived from a first free radical initiator and a second free radical initiator. The first free radical initiator and the second free radical initiators may be present in a weight ratio of from about 5:1 to about 1:5, or preferably from about 3:1 to about 1:3, or more preferably from about 2:1 to about 1:2, or even more preferably from about 1.5:1 to about 1:1.5.

The at least one free radical initiator may comprise an oil-soluble or oil-dispersible free radical initiator. The at least one free radical initiator may comprise a water-soluble or water-dispersible free radical initiator. The at least one free radical initiator may comprise an oil-soluble or oil-dispersible free radical initiator (e.g., as a first free radical initiator) and a water-soluble or water-dispersible free radical initiator (e.g., as a second free radical initiator).

Suitable free radical initiators may include peroxy initiators, azo initiators, or mixtures thereof. More particularly, and without limitation, the free radical initiator may be selected from the group consisting of: peroxide; dialkyl peroxide; alkylperoxide; peroxyester; peroxycarbonate; peroxyketone; peroxydicarbonate; 2,2'-azobis (isobutylnitrile); 2,2'-azobis(2,4-dimethylpentanenitrile); 2,2'-azobis (2,4-dimethylvaleronitrile); 2,2'-azobis(2-methylpropanenitrile); 2,2'-azobis(2-methylbutyronitrile); 1,1'-azobis (cyclohexanecarbonitrile); 1,1'-azobis(cyanocyclohexane); benzoyl peroxide; decanoyl peroxide; lauroyl peroxide; di(n-propyl) peroxydicarbonate; di(sec-butyl) peroxydicarbonate; di(2-ethylhexyl)peroxydicarbonate; 1,1-dimethyl-3-hydroxybutyl peroxyneodecanoate; a-cumyl peroxyneoheptanoate; t-amyl peroxyneodecanoate; t-butyl peroxyneodecanoate; t-amyl peroxypivalate; t-butyl peroxypivalate; 2,5-dimethyl 2,5-di (2-ethylhexanoyl peroxy) hexane; t-amyl peroxy-2-ethyl-hexanoate; t-butyl peroxy-2-ethylhexanoate; t-butyl peroxyacetate; di-t-amyl peroxyacetate; t-butyl peroxide; di-t-amyl peroxide; 2,5-dimethyl-2,5-di-(t-butylperoxy)hexyne-3; cumene hydroperoxide; 1,1-di-(t-butylperoxy)-3,3,5-trimethyl-cyclohexane; 1,1-di-(t-butylperoxy)-cyclohexane; 1,1-di-(t-amylperoxy)-cyclohexane; ethyl-3,3-di-(t-butylperoxy)-butyrate; t-amyl perbenzoate; t-butyl perbenzoate; ethyl 3,3-di-(t-amylperoxy)-butyrate; and combinations thereof.

Preferred free radical initiators may include: 4,4'-azobis (4-cyanovaleric acid); 1,1'-azobis(cyclohexanecarbonitrile); 2,2'-azobis(2-methylbutyronitrile); or combinations thereof.

3. Other Materials

Other materials may be present in or on the polymer wall. For example, the polymer wall may comprise an emulsifier, a coating, or a combination thereof.

The polymer wall may comprise an emulsifier as a result of the particle-making process. When making the delivery particle, emulsifier may optionally be included, preferably in the water phase. The emulsifier may be a polymeric emulsifier. Emulsifier can help with further stabilizing an emulsion during the particle-making process. In formation of the polymer wall of the delivery particle, the polymeric emulsifier can become entrapped in the polymer wall material. These inclusions of emulsifier into the polymer wall usefully can be used to advantage in modification of polymer wall properties, influencing such attributes as flexibility, leakage, strength, and other properties. Thus, the polymer wall of the delivery particles may further comprise a polymeric emulsifier entrapped in the polymer wall, preferably wherein the polymeric emulsifier comprises polyvinyl alcohol. As indicated above, however, the entrapped polymeric emulsifier is not to be included when determining the core:wall polymer weight ratio.

The benefit agent delivery particle may comprise from about 0.5% to about 40%, preferably from about 0.5% to about 20%, more preferably 0.8% to 5% of an emulsifier, based on the weight of the wall material. Preferably, the emulsifier is selected from the group consisting of polyvinyl alcohol, carboxylated or partially hydrolyzed polyvinyl alcohol, methyl cellulose, hydroxyethylcellulose, carboxymethylcellulose, methylhydroxypropylcellulose, salts or esters of stearic acid, lecithin, organosulphonic acid, 2-acrylamido-2-alkylsulphonic acid, styrene sulphonic acid, polyvinylpyrrolidone, copolymers of N-vinylpyrrolidone, polyacrylic acid, polymethacrylic acid; copolymers of acrylic acid and methacrylic acid, and water-soluble surfactant polymers which lower the surface tension of water.

The emulsifier preferably comprises polyvinyl alcohol, and the polyvinyl alcohol preferably has a hydrolysis degree from about 55% to about 99%, preferably from about 75% to about 95%, more preferably from about 85% to about 90% and most preferably from about 87% to about 89%. The polyvinyl alcohol may have a viscosity of from about 40 cps to about 80 cps, preferably from about 45 cps to about 72 cps, more preferably from about 45 cps to about 60 cps and most preferably 45 cps to 55 cps in an aqueous 4% polyvinyl alcohol solution at 20° C.; the viscosity of a polymer is determined by measuring a freshly made solution using a Brookfield LV type viscometer with UL adapter as described in British Standard EN ISO 15023-2:2006 Annex E Brookfield Test method. The polyvinyl alcohol may have a degree of polymerization of from about 1500 to about 2500, preferably from about 1600 to about 2200, more preferably from about 1600 to about 1900 and most preferably from about 1600 to about 1800. The weight average molecular weight of the polyvinyl alcohol may be of from about 130,000 to about 204,000 Daltons, preferably from about 146,000 to about 186,000, more preferably from about 146,000 to about 160,000, and most preferably from about 146,000 to about 155,000, and/or has a number average molecular weight of from about 65,000 to about 110,000 Daltons, preferably from about 70,000 to about 101,000, more preferably from about 70,000 to about 90,000 and most preferably from about 70,000 to about 80,000.

The wall of the delivery particles may comprise a coating, for example on an outer surface of the wall, away from the core. The encapsulates may be manufactured and be subsequently coated with a coating material. The coating may be useful as a deposition aid. The coating may comprise a cationic material, such as a cationic polymer. As indicated above, however, a coating that is not a structural or support feature of the wall is not to be included in calculations when determining the core:wall polymer weight ratio.

Non-limiting examples of coating materials include but are not limited to materials selected from the group consisting of poly(meth)acrylate, poly(ethylene-maleic anhydride), polyamine, wax, polyvinylpyrrolidone, polyvinylpyrrolidone co-polymers, polyvinylpyrrolidone-ethyl acrylate, polyvinylpyrrolidone-vinyl acrylate, polyvinylpyrrolidone methacrylate, polyvinylpyrrolidone/vinyl acetate, polyvinyl acetal, polyvinyl butyral, polysiloxane, poly(propylene maleic anhydride), maleic anhydride derivatives, co-polymers of maleic anhydride derivatives, polyvinyl alcohol, styrene-butadiene latex, gelatin, gum Arabic, carboxymethyl cellulose, carboxymethyl hydroxyethyl cellulose, hydroxyethyl cellulose, other modified celluloses, sodium alginate, chitosan, casein, pectin, modified starch, polyvinyl acetal, polyvinyl butyral, polyvinyl methyl ether/maleic anhydride, polyvinyl pyrrolidone and its co polymers, poly(vinyl pyrrolidone/methacrylamidopropyl trimethyl ammonium chloride), polyvinylpyrrolidone/vinyl acetate, polyvinyl pyrrolidone/dimethylaminoethyl methacrylate, polyvinyl amines, polyvinyl formamides, polyallyl amines and copolymers of polyvinyl amines, polyvinyl formamides, and polyallyl amines and mixtures thereof. The coating material may be a cationic polymer. The coating material may comprise polyvinyl formamide, chitosan, or combinations thereof, preferably chitosan.

B. Core Materials

The delivery particles of the present disclosure include a core. The core comprises a benefit agent. The core optionally comprises a partitioning modifier.

The core of a particle is surrounded by the polymer wall. When the polymer wall is ruptured, the benefit agent in the core is released.

1. Benefit Agent

Suitable benefit agents located in the core may include benefit agents that provide benefits to a surface, such as a fabric or hair.

The core may comprise from about 5% to about 100%, by weight of the core, of a benefit agent, which may preferably comprise a fragrance. The core may comprise from about 45% to about 95%, preferably from about 50% to about 80%, more preferably from about 50% to about 70%, by weight of the core, of the benefit agent, which may preferably comprise a fragrance.

The benefit agent may comprise an aldehyde-comprising benefit agent, a ketone-comprising benefit agent, or a combination thereof. Such benefit agents, such as aldehyde- or ketone-containing perfume raw materials, are known to provide preferred benefits, such as freshness benefits. However, as mentioned above, these agents may also interfere with wall formation during the particle-forming process. Thus, when such materials are present, it is particularly advantageous to form the delivery particles with the initiator levels as described herein in order to get preferred performance profiles.

The benefit agent may comprise at least about 20%, preferably at least about 25%, more preferably at least about 40%, even more preferably at least about 50%, by weight of the benefit agent, of aldehyde-containing benefit agents, ketone-containing benefit agents, or combinations thereof.

The benefit agent may be a hydrophobic benefit agent. Such agents are compatible with the oil phases that are common in making the delivery particles of the present disclosure.

The benefit agent may be selected from the group consisting of fragrance, silicone oils, waxes, hydrocarbons, higher fatty acids, essential oils, lubricants, lipids, skin coolants, vitamins, sunscreens, antioxidants, glycerine, catalysts, bleach particles, silicon dioxide particles, malodor reducing agents, odor-controlling materials, chelating agents, antistatic agents, softening agents, insect and moth repelling agents, colorants, antioxidants, chelants, bodying agents, drape and form control agents, smoothness agents, wrinkle control agents, sanitization agents, disinfecting agents, germ control agents, mold control agents, mildew control agents, antiviral agents, drying agents, stain resistance agents, soil release agents, fabric refreshing agents and freshness extending agents, chlorine bleach odor control agents, dye fixatives, dye transfer inhibitors, color maintenance agents, optical brighteners, color restoration/rejuvenation agents, anti-fading agents, whiteness enhancers, anti-abrasion agents, wear resistance agents, fabric integrity agents, anti-wear agents, anti-pilling agents, defoamers, anti-foaming agents, UV protection agents, sun fade inhibitors, anti-allergenic agents, enzymes, water proofing agents, fabric comfort agents, shrinkage resistance agents, stretch resistance agents, stretch recovery agents, skin care agents, glycerin, synthetic or natural actives, antibacterial actives, antiperspirant actives, cationic polymers, dyes, and mixtures thereof.

The encapsulated benefit agent may preferably comprise a fragrance, which may include one or more perfume raw materials. Fragrance is particularly suitable for encapsulation in the presently described delivery particles, as the fragrance-containing particles can provide freshness benefits across multiple touchpoints.

The term "perfume raw material" (or "PRM") as used herein refers to compounds having a molecular weight of at least about 100 g/mol and which are useful in imparting an odor, fragrance, essence or scent, either alone or with other perfume raw materials. Typical PRMs comprise inter alia alcohols, ketones, aldehydes, esters, ethers, nitrites and alkenes, such as terpene. A listing of common PRMs can be found in various reference sources, for example, "Perfume and Flavor Chemicals", Vols. I and II; Steffen Arctander Allured Pub. Co. (1994) and "Perfumes: Art, Science and Technology", Miller, P. M. and Lamparsky, D., Blackie Academic and Professional (1994).

The PRMs may be characterized by their boiling points (B.P.) measured at the normal pressure (760 mm Hg), and their octanol/water partitioning coefficient (P), which may be described in terms of log P, determined according to the test method below. Based on these characteristics, the PRMs may be categorized as Quadrant I, Quadrant II, Quadrant III, or Quadrant IV perfumes, as described in more detail below.

The fragrance may comprise perfume raw materials that have a log P of from about 2.5 to about 4. It is understood that other perfume raw materials may also be present in the fragrance.

The perfume raw materials may comprise a perfume raw material selected from the group consisting of perfume raw materials having a boiling point (B.P.) lower than about 250° C. and a log P lower than about 3, perfume raw materials having a B.P. of greater than about 250° C. and a log P of greater than about 3, perfume raw materials having a B.P. of greater than about 250° C. and a log P lower than about 3, perfume raw materials having a B.P. lower than about 250° C. and a log P greater than about 3 and mixtures thereof. Perfume raw materials having a boiling point B.P. lower than about 250° C. and a log P lower than about 3 are known as Quadrant I perfume raw materials. Quadrant 1 perfume raw materials are preferably limited to less than 30% of the perfume composition. Perfume raw materials having a B.P. of greater than about 250° C. and a log P of greater than about 3 are known as Quadrant IV perfume raw materials, perfume raw materials having a B.P. of greater than about 250° C. and a log P lower than about 3 are known as Quadrant II perfume raw materials, perfume raw materials having a B.P. lower than about 250° C. and a log P greater than about 3 are known as a Quadrant III perfume raw materials. Suitable Quadrant I, II, III and IV perfume raw materials are disclosed in U.S. Pat. No. 6,869,923 B1.

The consumer product composition according to any preceding claim, wherein the benefit agent comprises fragrance, preferably wherein the fragrance comprises at least about 20%, preferably at least about 25%, more preferably at least about 40%, even more preferably at least about 50%, by weight of the fragrance, of aldehyde-containing perfume raw materials, ketone-containing perfume raw materials, or combinations thereof.

Preferred aldehyde-containing perfume raw materials may include: methyl nonyl acetaldehyde: benzaldehyde; floralozone; isocyclocitral; triplal (ligustral); precyclemone B; lilial; decyl aldehyde; undecylenic aldehyde; cyclamen homoaldehyde; cyclamen aldehyde; dupical; oncidal; adoxal; melonal; calypsone; anisic aldehyde; heliotropin; cuminic aldehyde; scentenal; 3,6-dimethylcyclohex-3-ene-1-carbaldehyde; satinaldehyde; canthoxal; vanillin; ethyl vanillin; cinnamic aldehyde; cis-4-decenal; trans-4-decenal; cis-7-decenal; undecylenic aldehyde; trans-2-hexenal; trans-2-octenal; 2-undecenal; 2,4-dodecadeienal; cis-4-heptenal; Florydral; butyl cinnamaldehyde; limonelal; amyl cinnamaldehyde; hexyl cinnamaldehyde; citronellal; citral; cis-3-hexen-1-al; or mixtures thereof.

Preferred ketone-containing raw materials may include: nerolione; 4-(4-methoxyphenyl)butan-2-one; 1-naphthalen-2-ylethanone; nectaryl; trimofix 0; fleuramone; delta-damascone; beta-damascone; alpha-damascone; methyl ionone; 2-hexylcyclopent-2-en-1-one; galbascone; or mixtures thereof.

2. Partitioning Modifier

The core of the delivery particles of the present disclosure may comprise a partitioning modifier. The properties of the oily material in the core can play a role in determining how much, how quickly, and/or how permeable the polyacrylate shell material will be when established at the oil/water interface. For example, if the oil phase comprises highly polar materials, these materials may reduce the diffusion of the acrylate oligomers and polymers to the oil/water interface and result in a very thin, highly permeable shell. Incorporation of a partitioning modifier can adjust the polarity of the core, thereby changing the partition coefficient of the polar materials in the partitioning modifier versus the acrylate oligomers, and can result in the establishment of a well-defined, highly impermeable shell. The partitioning modifier may be combined with the core's perfume oil material prior to incorporation of the wall-forming monomers.

The partitioning modifier may be present in the core at a level of from about 5% to about 55%, preferably from about 10% to about 50%, more preferably from about 25% to about 50%, by weight of the core.

The partitioning modifier may comprise a material selected from the group consisting of vegetable oil, modified vegetable oil, mono-, di-, and tri-esters of $C_4$-$C_{24}$ fatty acids, isopropyl myristate, dodecanophenone, lauryl laurate, methyl behenate, methyl laurate, methyl palmitate, methyl stearate, and mixtures thereof. The partitioning modifier may preferably comprise or even consist of isopropyl myristate. The modified vegetable oil may be esterified and/or brominated. The modified vegetable oil may preferably comprise castor oil and/or soy bean oil. US Patent Application Publication 20110268802, incorporated herein by reference, describes other partitioning modifiers that may be useful in the presently described delivery particles.

C. Method of Making Delivery Particles

Delivery particles may be made according to known methods, so long as the initiator levels and core:shell ratios described herein are observed. Methods may be further adjusted to arrive at other desirable characteristics described herein, such as volume-weighted particle size, relative amounts of benefit agent and/or partitioning modifier, etc.

For example, the present disclosure relates to a process of making a population of delivery particles comprising a core and a polymer wall encapsulating the core. The process may comprise the step of providing an oil phase. The oil phase may comprise a benefit agent and a partition modifier, as described above. The process may further comprise dissolving or dispersing into the oil phase one or more oil-soluble or dispersible multifunctional (meth)acrylate monomers having at least three, and preferably at least four, at least five, or even at least six radical polymerizable functional groups with the proviso that at least one of the radical polymerizable groups is acrylate or methacrylate.

The oil-soluble or dispersible multifunctional (meth)acrylate monomers are described in more detail above. Among other things, the oil-soluble or dispersible multifunctional (meth)acrylate monomers may comprise a multifunctional aromatic urethane acrylate, preferably a tri-, tetra-, penta-, or hexafunctional aromatic urethane acrylate, or mixtures thereof, preferably comprising a hexafunctional aromatic urethane acrylate. The monomer may comprise one or more multifunctional aliphatic urethane acrylates, which may be dissolved or dispersed into the oil phase. The process may further comprise dissolving or dispersing one or more of an amine (meth)acrylate or an acidic (meth)acrylate into the oil phase.

The process may further comprise providing a water phase, which may comprise an emulsifier, a surfactant, or a combination thereof. The process may further comprise the step of dissolving or dispersing into the water phase one or more water-soluble or water-dispersible mono- or multi-functional (meth)acrylate monomers and/or oligomers.

The process may comprising a step of dissolving or dispersing in into the water phase, the oil phases, or both, of one or more amine (meth)acrylates, acidic (meth)acrylates, polyethylene glycol di(meth)acrylates, ethoxylated mono- or multi-functional (meth)acrylates, and/or other (meth) acrylate monomers.

In general, the oil soluble multifunctional (meth)acrylate monomer is soluble or dispersible in the oil phase, typically soluble at least to the extent of 1 gram in 100 ml of the oil, or dispersible or emulsifiable therein at 22 C. The water soluble multifunctional (meth)acrylate monomers are typically soluble or dispersible in water, typically soluble at least to the extent of 1 gram in 100 ml of water, or dispersible therein at 22 C.

Typically, the oil phase is combined with an excess of the water phase. If more than one oil phase is employed, these generally are first combined, and then combined with the water phase. If desired, the water phase can also comprise one or more water phases that are sequentially combined.

The oil phase may be emulsified into the water phase under high shear agitation to form an oil-in-water emulsion, which may comprise droplets of the core materials dispersed in the water phase. Typically, the amount of shear agitation applied can be controlled to form droplets of a target size, which influences the final size of the finished encapsulates.

The dissolved or dispersed monomers may be reacted by heating or actinic irradiation of the emulsion. The reaction can form a polymer wall at an interface of the droplets and the water phase. The radical polymerizable groups of the multifunctional methacrylate, upon heating, facilitate self-polymerization of the multifunctional methacrylate.

One or more free radical initiators are provided to the oil phase, the water phase, or both, preferably both. For example, the process may comprise adding one or more free radical initiators to the water phase, for example to provide a further source of free radicals upon activation by heat. The process may comprise adding one or more free radical initiators to the oil phase. The one or more free radical initiators may be added to the water phase, the oil phase, or both in an amount of from greater than 0% to about 5%, by weight of the respective phase. The free radical initiators may be added in an amount to achieve a concentration in the polymer walls such that the least one free radical initiator is present at a level of from about 15% to about 60%, by weight of the polymer wall. The at least one free radical initiator may be added so that it is resultingly present at a level of from about 20% to about 60%, preferably from about 20% to about 50%, more preferably from about 20% to about 45%, even more preferably from about 20% to about 35%, by weight of the polymer wall.

Latent initiators are also contemplated where a first action, particularly a chemical reaction, is needed to transform the latent initiator into an active initiator which subsequently initiates polymerization upon exposure to polymerizing conditions. Where multiple initiators are present, it is contemplated, and preferred, that each initiator be initiated or suitably initiated by a different condition.

In the described process, the heating step may comprise heating the emulsion from about 1 hour to about 20 hours, preferably from about 2 hours to about 15 hours, more preferably about 4 hours to about 10 hours, most preferably from about 5 to about 7 hours, thereby heating sufficiently to transfer from about 500 joules/kg to about 5000 joules/kg to said emulsion, from about 1000 joules/kg to about 4500 joules/kg to said emulsion, from about 2900 joules/kg to about 4000 joules/kg to said emulsion.

Prior to the heating step, the emulsion may be characterized by a volume-weighted median particle size of the emulsion droplets of from about 0.5 microns to about 100 microns, even from about 1 microns to about 60 microns, or even from 20 to 50 microns, preferably from about 30 microns to about 50 microns, with a view to forming a population of delivery particles with a volume-weighted target size, for example, of from about 30 to about 50 microns.

The benefit agent may be selected as described above, and is preferably a fragrance that comprises one or more perfume raw materials. The benefit agent may be the primary, or even only component, of the oil phase into which the other materials are dissolved or dispersed.

The partitioning modifier may be selected from the group consisting of isopropyl myristate, vegetable oil, modified vegetable oil, mono-, di-, and tri-esters of C4-C24 fatty acids, dodecanophenone, lauryl laurate, methyl behenate, methyl laurate, methyl palmitate, methyl stearate, and mixtures thereof, preferably isopropyl myristate. The partitioning modifier may be provided in an amount so as to comprise from about 5% to about 55% by weight of the core of the delivery particle.

It is desirable for the resulting delivery particles to be characterized by a core:wall ratio and/or particle sizes as described above, as such characteristics have been found to lead to advantageous performance.

For example, the present disclosure relates to a consumer product composition comprising: a treatment adjunct, and a population of delivery particles, wherein the delivery particles comprise a core and a polymer wall surrounding the core, wherein the delivery particles are obtainable by a process comprising the steps of: providing an oil phase comprising a benefit agent, the oil phase preferably further comprising a partitioning modifier; dissolving or dispersing into the oil phase one or more oil-soluble or oil-dispersible wall monomers, wherein the wall monomers comprise at least 50%, by weight of the wall monomers, of (meth) acrylate monomers, preferably multifunctional (meth)acrylate monomers having at least three, and preferably at least four, at least five, or even at least six radical polymerizable functional groups with the proviso that at least one of the radical polymerizable groups is acrylate or methacrylate; providing at least one free radical initiator (e.g., a first free radical initiator) in the oil phase; providing a water phase comprising an emulsifier or surfactant, and optionally at least one other free radical initiator (e.g., a second free radical initiator); emulsifying the oil phase into the water phase under high shear agitation to form an oil-in-water emulsion comprising droplets of the oil phase dispersed in the water phase; reacting the dissolved or dispersed monomers by heating or actinic irradiation of the emulsion, thereby forming a polymer wall at an interface of the droplets and the water phase, resulting in delivery particles that have a core surrounded by the polymer wall, wherein the free radical initiator or initiators comprise from about 15% to 60% by weight of the polymer wall, and wherein the core and the polymer wall are present in a weight ratio of from about 95:5 to about 99.5:0.5.

The process of obtaining the delivery particles may comprise the further step of addition to the water phase of one or more free radical initiators to provide a further source of free radicals upon activation by heat.

The process of obtaining the delivery particles may comprise the further step of dissolving or dispersing into the water phase one or more mono- or multi-functional (meth) acrylate monomers and/or oligomers. The multifunctional (meth)acrylate monomers having radical polymerizable functional groups may be a multifunctional aromatic urethane acrylate. The multifunctional (meth)acrylate monomers having radical polymerizable functional groups may be a tri-, tetra-, penta-, or hexafunctional aromatic urethane acrylate.

The dissolving or dispersing step into the oil phase may further comprise dissolving or dispersing into the oil phase or phases one or more multifunctional aliphatic urethane acrylates.

The process of obtaining the delivery particles may comprise the further step of dissolving or dispersing one or more of an amine methacrylate or an acidic methacrylate.

The process of obtaining the delivery particles may comprise the further step of dissolving or dispersing in into either the water or oil phases, or both, of one or more amine methacrylates, acidic methacrylates, polyethylene glycol di(meth)acrylates, ethoxylated mono- or multi-functional (meth)acrylates, and/or (meth)acrylate monomers and/or oligomers.

As a result of the method of making delivery particles provided herein, the delivery particles may be present in an aqueous slurry, for example, the particles may be present in the slurry at a level of from about 20% to about 60%, preferably from about 30% to about 50%, by weight of the slurry. Additional materials may be added to the slurry, such as preservatives, solvents, structurants, or other processing or stability aids. The slurry may comprise one or more perfumes (i.e., unencapsulated perfumes) that are different from the perfume or perfumes contained in the core of the benefit agent delivery particles.

Exemplary synthesis methods that can form encapsulates according the present disclosure are further described in Example 1 below.

Consumer Product Adjunct Material

The consumer product compositions of the present disclosure comprise a consumer product adjunct material in addition to the population of delivery particles. The consumer product adjunct material may provide a benefit in the intended end-use of a composition, or it may be a processing and/or stability aid.

Suitable consumer product adjunct materials may include: surfactants, conditioning actives, deposition aids, rheology modifiers or structurants, bleach systems, stabilizers, builders, chelating agents, dye transfer inhibiting agents, dispersants, enzymes, and enzyme stabilizers, catalytic metal complexes, polymeric dispersing agents, clay and soil removal/anti-redeposition agents, brighteners, suds suppressors, silicones, hueing agents, aesthetic dyes, additional perfumes and perfume delivery systems, structure elasticizing agents, carriers, hydrotropes, processing aids, anti-agglomeration agents, coatings, formaldehyde scavengers, and/or pigments.

Depending on the intended form, formulation, and/or end-use, compositions of the present disclosure might not contain one or more of the following adjuncts materials: bleach activators, surfactants, builders, chelating agents, dye transfer inhibiting agents, dispersants, enzymes, and enzyme stabilizers, catalytic metal complexes, polymeric dispersing agents, clay and soil removal/anti-redeposition agents, brighteners, suds suppressors, dyes, additional perfumes and perfume delivery systems, structure elasticizing agents, fabric softeners, carriers, hydrotropes, processing aids, structurants, anti-agglomeration agents, coatings, formaldehyde scavengers, and/or pigments.

The precise nature of these additional components, and levels of incorporation thereof, will depend on the physical form of the composition and the nature of the operation for which it is to be used. However, when one or more adjuncts are present, such one or more adjuncts may be present as detailed below. The following is a non-limiting list of suitable additional adjuncts.

A. Surfactants

The compositions of the present disclosure may comprise surfactant. Surfactants may be useful for providing, for example, cleaning benefits. The compositions may comprise a surfactant system, which may contain one or more surfactants.

The compositions of the present disclosure may include from about 0.1% to about 70%, or from about 2% to about 60%, or from about 5% to about 50%, by weight of the composition, of a surfactant system. Liquid compositions may include from about 5% to about 40%, by weight of the composition, of a surfactant system. Compact formulations, including compact liquids, gels, and/or compositions suitable for a unit dose form, may include from about 25% to about 70%, or from about 30% to about 50%, by weight of the composition, of a surfactant system.

The surfactant system may include anionic surfactant, nonionic surfactant, zwitterionic surfactant, cationic surfactant, amphoteric surfactant, or combinations thereof. The surfactant system may include linear alkyl benzene sulfonate, alkyl ethoxylated sulfate, alkyl sulfate, nonionic surfactant such as ethoxylated alcohol, amine oxide, or mixtures thereof. The surfactants may be, at least in part, derived from natural sources, such as natural feedstock alcohols.

Suitable anionic surfactants may include any conventional anionic surfactant. This may include a sulfate detersive surfactant, for e.g., alkoxylated and/or non-alkoxylated alkyl sulfate materials, and/or sulfonic detersive surfactants, e.g., alkyl benzene sulfonates. The anionic surfactants may be linear, branched, or combinations thereof. Preferred surfactants include linear alkyl benzene sulfonate (LAS), alkyl ethoxylated sulfate (AES), alkyl sulfates (AS), or mixtures thereof. Other suitable anionic surfactants include branched modified alkyl benzene sulfonates (MLAS), methyl ester sulfonates (MES), sodium lauryl sulfate (SLS), sodium lauryl ether sulfate (SLES), and/or alkyl ethoxylated carboxylates (AEC). The anionic surfactants may be present in acid form, salt form, or mixtures thereof. The anionic surfactants may be neutralized, in part or in whole, for example, by an alkali metal (e.g., sodium) or an amine (e.g., monoethanolamine).

The surfactant system may include nonionic surfactant. Suitable nonionic surfactants include alkoxylated fatty alcohols, such as ethoxylated fatty alcohols. Other suitable nonionic surfactants include alkoxylated alkyl phenols, alkyl phenol condensates, mid-chain branched alcohols, mid-chain branhed alkyl alkoxylates, alkylpolysaccharides (e.g., alkylpolyglycosides), polyhydroxy fatty acid amides, ether capped poly(oxyalkylated) alcohol surfactants, and mixtures thereof. The alkoxylate units may be ethyleneoxy units, propyleneoxy units, or mixtures thereof. The nonionic surfactants may be linear, branched (e.g., mid-chain branched), or a combination thereof. Specific nonionic surfactants may include alcohols having an average of from about 12 to about 16 carbons, and an average of from about 3 to about 9 ethoxy groups, such as C12-C14 EO7 nonionic surfactant.

Suitable zwitterionic surfactants may include any conventional zwitterionic surfactant, such as betaines, including alkyl dimethyl betaine and cocodimethyl amidopropyl betaine, $C_8$ to $C_{18}$ (for example from $C_{12}$ to $C_{18}$) amine oxides (e.g., $C_{12-14}$ dimethyl amine oxide), and/or sulfo and hydroxy betaines, such as N-alkyl-N,N-dimethylammino-1-propane sulfonate where the alkyl group can be $C_8$ to $C_{18}$, or from $C_{10}$ to $C_{14}$. The zwitterionic surfactant may include amine oxide.

Depending on the formulation and/or the intended end-use, the composition may be substantially free of certain surfactants. For example, liquid fabric enhancer compositions, such as fabric softeners, may be substantially free of anionic surfactant, as such surfactants may negatively interact with cationic ingredients.

B. Conditioning Active

The compositions of the present disclosure may include a conditioning active. Compositions that contain conditioning actives may provide softness, anti-wrinkle, anti-static, conditioning, anti-stretch, color, and/or appearance benefits.

Conditioning actives may be present at a level of from about 1% to about 99%, by weight of the composition. The composition may include from about 1%, or from about 2%, or from about 3%, to about 99%, or to about 75%, or to about 50%, or to about 40%, or to about 35%, or to about 30%, or to about 25%, or to about 20%, or to about 15%, or to about 10%, by weight of the composition, of conditioning active. The composition may include from about 5% to about 30%, by weight of the composition, of conditioning active.

Conditioning actives suitable for compositions of the present disclosure may include quaternary ammonium ester compounds, silicones, non-ester quaternary ammonium compounds, amines, fatty esters, sucrose esters, silicones, dispersible polyolefins, polysaccharides, fatty acids, softening or conditioning oils, polymer latexes, or combinations thereof.

The composition may include a quaternary ammonium ester compound, a silicone, or combinations thereof, preferably a combination. The combined total amount of quaternary ammonium ester compound and silicone may be from about 5% to about 70%, or from about 6% to about 50%, or from about 7% to about 40%, or from about 10% to about 30%, or from about 15% to about 25%, by weight of the composition. The composition may include a quaternary ammonium ester compound and silicone in a weight ratio of from about 1:10 to about 10:1, or from about 1:5 to about 5:1, or from about 1:3 to about 1:3, or from about 1:2 to about 2:1, or about 1:1.5 to about 1.5:1, or about 1:1.

The composition may contain mixtures of different types of conditioning actives. The compositions of the present disclosure may contain a certain conditioning active but be substantially free of others. For example, the composition may be free of quaternary ammonium ester compounds, silicones, or both. The composition may comprise quaternary ammonium ester compounds but be substantially free of silicone. The composition may comprise silicone but be substantially free of quaternary ammonium ester compounds.

C. Deposition Aid

The compositions of the present disclosure may comprise a deposition aid. Deposition aids can facilitate deposition of delivery particles, conditioning actives, perfumes, or combinations thereof, improving the performance benefits of the compositions and/or allowing for more efficient formulation of such benefit agents. The composition may comprise, by weight of the composition, from 0.0001% to 3%, preferably from 0.0005% to 2%, more preferably from 0.001% to 1%, or from about 0.01% to about 0.5%, or from about 0.05% to about 0.3%, of a deposition aid. The deposition aid may be a cationic or amphoteric polymer, preferably a cationic polymer.

Cationic polymers in general and their methods of manufacture are known in the literature. Suitable cationic polymers may include quaternary ammonium polymers known the "Polyquaternium" polymers, as designated by the International Nomenclature for Cosmetic Ingredients, such as Polyquaternium-6 (poly(diallyldimethylammonium chloride), Polyquaternium-7 (copolymer of acrylamide and diallyldimethylammonium chloride), Polyquaternium-10 (quaternized hydroxyethyl cellulose), Polyquaternium-22 (copolymer of acrylic acid and diallyldimethylammonium chloride), and the like.

The deposition aid may be selected from the group consisting of polyvinylformamide, partially hydroxylated polyvinylformamide, polyvinylamine, polyethylene imine, ethoxylated polyethylene imine, polyvinylalcohol, polyacrylates, and combinations thereof. The cationic polymer may comprise a cationic acrylate.

Deposition aids can be added concomitantly with delivery particles (at the same time with, e.g., encapsulated benefit agents) or directly/independently in the consumer product composition. The weight-average molecular weight of the polymer may be from 500 to 5000000 or from 1000 to 2000000 or from 2500 to 1500000 Dalton, as determined by size exclusion chromatography relative to polyethyleneoxide standards using Refractive Index (RI) detection. The weight-average molecular weight of the cationic polymer may be from 5000 to 37500 Dalton.

D. Rheology Modifier Structurant

The compositions of the present disclosure may contain a rheology modifier and/or a structurant. Rheology modifiers may be used to "thicken" or "thin" liquid compositions to a desired viscosity. Structurants may be used to facilitate phase stability and/or to suspend or inhibit aggregation of particles in liquid composition, such as the delivery particles as described herein.

Suitable rheology modifiers and/or structurants may include non-polymeric crystalline hydroxyl functional structurants (including those based on hydrogenated castor oil), polymeric structuring agents, cellulosic fibers (for example, microfibrillated cellulose, which may be derived from a bacterial, fungal, or plant origin, including from wood), di-amido gellants, or combinations thereof.

Polymeric structuring agents may be naturally derived or synthetic in origin. Naturally derived polymeric structurants may comprise hydroxyethyl cellulose, hydrophobically modified hydroxyethyl cellulose, carboxymethyl cellulose, polysaccharide derivatives and mixtures thereof. Polysaccharide derivatives may comprise pectine, alginate, arabinogalactan (gum Arabic), carrageenan, gellan gum, xanthan gum, guar gum and mixtures thereof. Synthetic polymeric structurants may comprise polycarboxylates, polyacrylates, hydrophobically modified ethoxylated urethanes, hydrophobically modified non-ionic polyols and mixtures thereof. Polycarboxylate polymers may comprise a polyacrylate, polymethacrylate or mixtures thereof. Polyacrylates may comprise a copolymer of unsaturated mono- or di-carbonic acid and $C_1$-$C_{30}$ alkyl ester of the (meth)acrylic acid. Such copolymers are available from Noveon inc under the tradename Carbopol Aqua 30. Another suitable structurant is sold under the tradename Rheovis CDE, available from BASF.

Process of Making a Composition

The present disclosure relates to processes for making any of the consumer product compositions described herein. The process of making a consumer product composition may comprise the step of combining a delivery particle (or population thereof) as described herein with a consumer product adjunct material as described herein.

The delivery particles may be combined with such one or more consumer product adjunct materials when the delivery particles are in one or more forms, including a slurry form, neat delivery particle form, and/or spray dried delivery particle form, preferably in slurry form. The delivery particles may be combined with such consumer product adjunct materials by methods that include mixing and/or spraying.

The compositions of the present disclosure can be formulated into any suitable form and prepared by any process chosen by the formulator. The delivery particles and adjunct materials may be combined in a batch process, in a circulation loop process, and/or by an in-line mixing process. Suitable equipment for use in the processes disclosed herein may include continuous stirred tank reactors, homogenizers, turbine agitators, recirculating pumps, paddle mixers, high shear mixers, static mixers, plough shear mixers, ribbon blenders, vertical axis granulators and drum mixers, both in batch and, where available, in continuous process configurations, spray dryers, and extruders.

Method of Treating a Surface or Article

The present disclosure further relates to methods of treating a surface or article with a composition according to the present disclosure. Such methods may provide cleaning, conditioning, and/or freshening benefits.

Suitable surfaces or articles may include fabrics (including clothing, towels, or linens), hard surfaces (such as tile, porcelain, linoleum or wood floors), dishware, hair, skin, or mixtures thereof.

The method may include a step of contacting a surface or article with a composition of the present disclosure. The composition may be in neat form or diluted in a liquor, for example, a wash or rinse liquor. The composition may be diluted in water prior, during, or after contacting the surface or article. The surface or article may be optionally washed and/or rinsed before and/or after the contacting step.

The method of treating and/or cleaning a surface or article may include the steps of:

a) optionally washing, rinsing and/or drying the surface or article;
b) contacting the surface or article with a composition as described herein, optionally in the presence of water;
c) optionally washing and/or rinsing the surface or article; and
d) optionally dried by drying passively and/or via an active method such as a laundry dryer.

For purposes of the present invention, washing includes but is not limited to, scrubbing, and mechanical agitation. The fabric may comprise most any fabric capable of being laundered or treated in normal consumer use conditions.

Liquors that may comprise the disclosed compositions may have a pH of from about 3 to about 11.5. When diluted, such compositions are typically employed at concentrations of from about 500 ppm to about 15,000 ppm in solution. When the wash solvent is water, the water temperature typically ranges from about 5° C. to about 90° C. and, when the situs comprises a fabric, the water to fabric ratio is typically from about 1:1 to about 30:1.

Combinations

Specifically contemplated combinations of the disclosure are herein described in the following lettered paragraphs. These combinations are intended to be illustrative in nature and are not intended to be limiting.

A. A consumer product composition comprising: a population of delivery particles, wherein the delivery particles comprise a core and a polymer wall surrounding the core, wherein the polymer wall comprises a (meth)acrylate polymer derived, at least in part, from wall monomers and at least one free radical initiator, wherein the wall monomers comprise at least 50%, by weight of the wall monomers, of (meth)acrylate monomers, wherein the at least one free radical initiator is present at a level of from about 15% to about 60%, by weight of the polymer wall, wherein the core comprises a benefit agent, wherein the core and the polymer wall are present in a weight ratio of from about 95:5 to about 99.5:0.5; and a consumer product adjunct material.

B. A consumer product composition comprising: a consumer product treatment adjunct, and a population of delivery particles, wherein the delivery particles comprise a core and a polymer wall surrounding the core, wherein the delivery particles are obtainable by a process comprising the steps of: —providing an oil phase comprising a benefit agent, the oil phase preferably further comprising a partitioning modifier; —dissolving or dispersing into the oil phase one or more oil-soluble or oil-dispersible wall monomers, wherein the wall monomers comprise at least 50%, by weight of the wall monomers, of (meth)acrylate monomers, preferably multifunctional (meth)acrylate monomers having at least three, and preferably at least four, at least five, or even at least six radical polymerizable functional groups with the proviso that at least one of the radical polymerizable groups is acrylate or methacrylate; —providing at least one free radical initiator (e.g., a first free radical initiator) in the oil phase; —providing a water phase comprising an emulsifier or surfactant, and optionally at least one other free radical initiator (e.g., a second free radical initiator); —emulsifying the oil phase into the water phase under high shear agitation to form an oil-in-water emulsion comprising droplets of the oil phase dispersed in the water phase; —reacting the dissolved or dispersed monomers by heating or actinic irradiation of the emulsion, thereby forming a polymer wall at an interface of the droplets and the water phase, resulting in delivery particles that have the core surrounded by the polymer wall, wherein the free radical initiator or initiators comprise from about 15% to 60% by weight of the polymer wall, and wherein the core and the polymer wall are present in a weight ratio of from about 95:5 to about 99.5:0.5.

C. The consumer product composition according to any of paragraphs A or B, wherein the wall monomers comprise at least 60%, preferably at least 70%, preferably at least 80%, more preferably at least 90%, even more preferably at least 95%, by weight of the wall monomers, of (meth)acrylate monomers.

D. The consumer product composition according to any of paragraphs A-C, wherein the (meth)acrylate monomers are oil-soluble or oil-dispersible.

E. The consumer product composition according to any of paragraphs A-D, wherein the (meth)acrylate monomers are multifunctional (meth)acrylate monomers, preferably having at least three radical polymerizable functional groups, with the proviso that at least one, more preferably at least three, of the radical polymerizable groups is acrylate or methacrylate.

F. The consumer product composition according to any of paragraphs A-E, wherein the at least one free radical initiator comprises a first free radical initiator and a second free radical initiator, preferably wherein the first free radical initiator and the second free radical initiator are present in a weight ratio of from about 5:1 to about 1:5, or preferably from about 3:1 to about 1:3, or more preferably from about 2:1 to about 1:2, or even more preferably from about 1.5:1 to about 1:1.5.

G. The consumer product composition according to any of paragraphs A-F, wherein the at least one free radical initiator comprises a comprises a water-soluble or water-dispersible free radical initiator, preferably a water-soluble or water-dispersible free radical initiator and an oil-soluble or oil-dispersible free radical initiator.

H. The consumer product composition according to any of paragraphs A-G, wherein the at least one free radical initiator comprises a material selected from the group consisting of peroxy initiators, azo initiators, and combinations thereof; preferably at least one free radical initiator selected from the group consisting of: peroxide; dialkyl peroxide; alkylperoxide; peroxyester; peroxycarbonate; peroxyketone; peroxydicarbonate; 2,2'-azobis (isobutylnitrile); 2,2'-azobis(2,4-dimethylpentanenitrile); 2,2'-azobis (2,4-dimethylvaleronitrile); 2,2'-azobis(2-methylpropanenitrile); 2,2'-azobis(2-methylbutyronitrile); 1,1'-azobis (cyclohexanecarbonitrile); 1,1'-azobis(cyanocyclohexane); benzoyl peroxide; decanoyl peroxide; lauroyl peroxide; di(n-propyl) peroxydicarbonate; di(sec-butyl) peroxydicarbonate; di(2-ethylhexyl)peroxydicarbonate; 1,1-dimethyl-3-hydroxybutyl peroxyneodecanoate; a-cumyl peroxyneoheptanoate; t-amyl peroxyneodecanoate; t-butyl peroxyneodecanoate; t-amyl peroxypivalate; t-butyl peroxypivalate; 2,5-dimethyl 2,5-di (2-ethylhexanoyl peroxy) hexane; t-amyl peroxy-2-ethyl-hexanoate; t-butyl peroxy-2-ethylhexanoate; t-butyl peroxyacetate; di-t-amyl peroxyacetate; t-butyl peroxide; di-t-amyl peroxide; 2,5-dimethyl-2,5-di-(t-butylperoxy)hexyne-3; cumene hydroperoxide; 1,1-di-(t-butylperoxy)-3,3,5-trimethyl-cyclohexane; 1,1-di-(t-butylperoxy)-cyclohexane; 1,1-di-(t-amylperoxy)-cyclohexane; ethyl-3,3-di-(t-butylperoxy)-butyrate; t-amyl perbenzoate; t-butyl perbenzoate; ethyl 3,3-di-(t-amylperoxy)-butyrate; and combinations thereof; more preferably selected from the group consisting of: 4,4'-azobis(4-cyanovaleric acid); 1,1'-azobis(cyclohexanecarbonitrile); 2,2'-azobis(2-methylbutyronitrile); and combinations thereof.

I. The consumer product composition according to any of paragraphs A-H, wherein the at least one free radical initiator is present at a level of from about 20% to about 60%, preferably from about 20% to about 50%, more preferably from about 20% to about 45%, even more preferably from about 20% to about 35%, by weight of the polymer wall.

J. The consumer product composition according to any of paragraphs A-I, wherein the core and the polymer wall are present in a weight ratio of from about 96:4 to about 99:1, preferably from about 97:3 to about 99:1, even more preferably from about 97:3 to about 98:2.

K. The consumer product composition according to any of paragraphs A-J, wherein the core comprises from 5% to 100%, by weight of the core, of a benefit agent.

L. The consumer product composition according to any of paragraphs A-K, wherein the benefit agent comprises an aldehyde-comprising benefit agent, a ketone-comprising benefit agent, or a combination thereof.

M. The consumer product composition according to any of paragraphs A-L, wherein the benefit agent comprises fragrance, preferably wherein the fragrance comprises at least about 20%, by weight of the fragrance, of aldehyde-containing perfume raw materials, ketone-containing perfume raw materials, or combinations thereof.

N. The consumer product composition according to any of paragraphs A-M, wherein the core comprises a partitioning modifier, preferably wherein the partitioning modifier is present in the core at a level of from about 5% to about 55%, by weight of the core, more preferably wherein the partitioning modifier is selected from the group consisting of isopropyl myristate, vegetable oil, modified vegetable oil, mono-, di-, and tri-esters of C4-C24 fatty acids, dodecanophenone, lauryl laurate, methyl behenate, methyl laurate, methyl palmitate, methyl stearate, and mixtures thereof, even more preferably isopropyl myristate.

O. The consumer product composition according to any of paragraphs A-N, wherein the polymer wall of the delivery particles further comprise a polymeric emulsifier entrapped in the polymer wall, preferably wherein the polymeric emulsifier comprises polyvinyl alcohol.

P. The consumer product composition according to any of paragraphs A-O, wherein the delivery particles are characterized by a volume-weighted median particle size from about 10 to about 100 microns, preferably from about 15 to about 60 microns, more preferably from about 20 to about 50 microns, even more preferably from about 30 to about 40 microns.

Q. The consumer product composition according to any of paragraphs A-P, wherein the population of delivery particles is characterized by an average Fracture Strength of from about 0.5 to about 5 MPa, preferably from about 1 to about 3 MPa, more preferably from about 1 to about 2 MPa.

R. The consumer product composition according to any of paragraphs A-Q, wherein delivery particles comprise a coating.

S. The consumer product composition according to any of paragraphs A-R, wherein the consumer product adjunct material is selected from the group consisting of surfactants, conditioning actives, deposition aids, rheology modifiers or structurants, bleach systems, stabilizers, builders, chelating agents, dye transfer inhibiting agents, dispersants, enzymes, enzyme stabilizers, catalytic metal complexes, polymeric dispersing agents, clay and soil removal/anti-redeposition agents, brighteners, suds suppressors, silicones, hueing agents, aesthetic dyes, neat perfume, additional perfume delivery systems, structure elasticizing agents, carriers, hydrotropes, processing aids, anti-agglomeration agents, coatings, formaldehyde scavengers, pigments, and mixtures thereof.

T. The consumer product composition according to any of paragraphs A-S, wherein the composition is a fabric care composition, a hard surface cleaner composition, a dish care composition, a hair care composition, a body cleansing composition, or a mixture thereof, preferably a fabric care composition, more preferably a fabric care composition that is a laundry detergent composition, a fabric conditioning composition, a laundry additive, a fabric pre-treat composition, a fabric refresher composition, or a mixture thereof.

U. The consumer product composition according to any of paragraphs A-T, wherein the composition is in the form of a liquid composition, a granular composition, a hydrocolloid, a single-compartment pouch, a multi-compartment pouch, a dissolvable sheet, a pastille or bead, a fibrous article, a tablet, a stick, a bar, a flake, a foam/mousse, a non-woven sheet, or a mixture thereof.

V. A method of treating a surface, wherein the method comprises the step of contacting the surface with a consumer product composition according to any of paragraphs A-U, optionally in the presence of water.

Test Methods

It is understood that the test methods disclosed in the Test Methods section of the present application should be used to determine the respective values of the parameters of Applicant's claimed subject matter as claimed and described herein.

Extraction of Delivery Particles from Finished Products.

Except where otherwise specified herein, the preferred method to isolate delivery particles from finished products is based on the fact that the density of most such delivery particles is different from that of water. The finished product is mixed with water in order to dilute and/or release the delivery particles. The diluted product suspension is centrifuged to speed up the separation of the delivery particles. Such delivery particles tend to float or sink in the diluted solution/dispersion of the finished product. Using a pipette or spatula, the top and bottom layers of this suspension are removed and undergo further rounds of dilution and centrifugation to separate and enrich the delivery particles. The delivery particles are observed using an optical microscope equipped with crossed-polarized filters or differential interference contrast (DIC), at total magnifications of 100× and 400×. The microscopic observations provide an initial indication of the presence, size, quality and aggregation of the delivery particles.

For extraction of delivery particles from a liquid fabric enhancer finished product conduct the following procedure:

1. Place three aliquots of approximately 20 ml of liquid fabric enhancer into three separate 50 ml centrifuge tubes and dilute each aliquot 1:1 with DI water (e.g. 20 ml fabric enhancer+20 ml DI water), mix each aliquot well and centrifuge each aliquot for 30 minutes at approximately 10000×g.
2. After centrifuging per Step 1, discard the bottom water layer (around 10 ml) in each 50 ml centrifuge tube then add 10 ml of DI water to each 50 ml centrifuge tube.
3. For each aliquot, repeat the process of centrifuging, removing the bottom water layer and then adding 10 ml of DI water to each 50 ml centrifuge tube two additional times.
4. Remove the top layer with a spatula or a pipette, and
5. Transfer this top layer into a 1.8 ml centrifuge tube and centrifuge for 5 minutes at approximately 20000×g.
6. Remove the top layer with a spatula and transfer into a new 1.8 ml centrifuge tube and add DI water until the tube is completely filled, then centrifuge for 5 minutes at approximately 20000×g.
7. Remove the bottom layer with a fine pipette and add DI water until tube is completely filled and centrifuge for 5 minutes at approximately 20000×g.
8. Repeat step 7 for an additional 5 times (6 times in total).

If both a top layer and a bottom layer of enriched delivery particles appear in the above described step 1, then, immediately move to step 3 (i.e., omit step 2) and proceed steps with steps 4 through 8. Once those steps have been completed, also remove the bottom layer from the 50 ml centrifuge tube from step 1, using a spatula or/and a pipette. Transfer the bottom layer into a 1.8 ml centrifuge tube and centrifuge 5 min at approximately 20000×g. Remove the bottom layer in a new tube and add DI water until the tube is completely filled then centrifuge for 5 minutes approximately 20000×g. Remove the top layer (water) and add DI water again until the tube is full. Repeat this another 5 times (6 times in total). Recombine the delivery particle enriched and isolated top and bottom layers back together.

If the fabric enhancer has a white color or is difficult to distinguish the delivery particle enriched layers add 4 drops of dye (such as Liquitint Blue JH 5% premix from Milliken & Company, Spartanburg, S.C., USA) into the centrifuge tube of step 1 and proceed with the isolation as described.

For extraction of delivery particles from solid finished products that disperse readily in water, mix 1 L of DI water with 20 g of the finished product (e.g. detergent foams, films, gels and granules; or water-soluble polymers; soap flakes and soap bars; and other readily water-soluble matrices such as salts, sugars, clays, and starches). When extracting delivery particles from finished products which do not disperse readily in water, such as waxes, dryer sheets, dryer bars, and greasy materials, it may be necessary to add detergents, agitation, and/or gently heat the product and diluent in order to release the delivery particles from the matrix. The use of organic solvents or drying out of the delivery particles should be avoided during the extraction steps as these actions may damage the delivery particles during this phase.

For extraction of delivery particles from liquid finished products which are not fabric softeners or fabric enhancers (e.g., liquid laundry detergents, liquid dish washing detergents, liquid hand soaps, lotions, shampoos, conditioners, and hair dyes), mix 20 ml of finished product with 20 ml of DI water. If necessary, NaCl (e.g., 1 to 4 g NaCl) can be added to the diluted suspension in order to increase the density of the solution and facilitate the delivery particles floating to the top layer. If the product has a white color which makes it difficult to distinguish the layers of delivery particles formed during centrifugation, a water-soluble dye can be added to the diluent to provide visual contrast.

The water and product mixture is subjected to sequential rounds of centrifugation, involving removal of the top and bottom layers, re-suspension of those layers in new diluent, followed by further centrifugation, isolation and re-suspension. Each round of centrifugation occurs in tubes of 1.5 to 50 ml in volume, using centrifugal forces of up to 20,000×g, for periods of 5 to 30 minutes. At least six rounds of centrifugation are typically needed to extract and clean sufficient delivery particles for testing. For example, the initial round of centrifugation may be conducted in 50 ml tubes spun at 10,000×g for 30 mins, followed by five more rounds of centrifugation where the material from the top and bottom layers is resuspended separately in fresh diluent in 1.8 ml tubes and spun at 20,000×g for 5 mins per round.

If delivery particles are observed microscopically in both the top and bottom layers, then the delivery particles from these two layers are recombined after the final centrifugation step, to create a single sample containing all the delivery particles extracted from that product. The extracted delivery particles should be analyzed as soon as possible but may be stored as a suspension in DI water for up to 14 days before they are analyzed.

One skilled in the art will recognize that various other protocols may be constructed for the extraction and isolation of delivery particles from finished products and will recognize that such methods require validation via a comparison of the resulting measured values, as measured before and after the delivery particles' addition to and extraction from finished product.

Determining Perfume Leakage

To determine perfume leakage, a liquid detergent with perfume encapsulates is prepared and stored (e.g., one week at 35° C.), and then compared to a reference sample of liquid detergent having an equal level of total perfume (e.g., 1 wt %), though unencapsulated.

To prepare the Internal Standard Solution, weigh 70 mg of tonalid, add 20 mL hexane p.a., and mix. Add 200 μL of this mixture to 20 mL hexane p.a. and mix to homogenize, forming the Internal Standard Solution.

To extract the perfume from liquid phase of the test sample or the reference sample, 2 grams of the detergent sample and 2 mL of the Internal Standard Solution are placed into an extraction vessel. Free perfume is extracted from the detergent sample by gently inverting the extraction vessel manually twenty times. A spoon tip of sodium sulphate is added to the extraction vessel. A separation of layers should occur.

To collect Gas Chromatograph data, after the separation into layers, immediately transfer the hexane layer into a Gas Chromatograph auto sampler vial and cap the vial. Inject 1.5 uL splitless into the Gas Chromatograph injection port. Run Gas Chromatographic Mass Spectrometric analysis (Gas Chromatographic separation on Durawax-4 [60 m, 0.32 mm ID, 0.25 μm Film] 40° C./4° C./min/230° C./20').

The perfume leakage from the encapsulates is calculated per Perfume Raw Material according to the following calculation:

$$\%\ \text{perfume leakage} = \frac{\text{Area Perfume Raw Material caps} \times \text{Area Internal Standard Solution } ref \times \text{Weight } ref}{\text{Area Internal Standard Solution caps} \times \text{Area Perfume Raw Material } ref \times \text{Weight caps}} * 100$$

Total leakage of a perfume is the sum of the perfume leakage from capsules per individual PRM.

To determine perfume retention (e.g., percentage of perfume that remains in the encapsulate), the "% perfume leakage" is subtracted from 100.

Viscosity

Viscosity of liquid finished product is measured using an AR 550 rheometer/viscometer from TA instruments (New Castle, Del., USA), using parallel steel plates of 40 mm diameter and a gap size of 500 μm. The high shear viscosity at 20 $s^{-1}$ and low shear viscosity at 0.05 $s^{-1}$ is obtained from a logarithmic shear rate sweep from 0.01 $s^{-1}$ to 25 $s^{-1}$ in 3 minutes time at 21° C.

Perfume, Perfume Raw Materials (PRMs), and/or Partitioning Modifier

A. Identity and Total Quantity

To determine the identity and to quantify the total weight of perfume, perfume ingredients, or Perfume Raw Materials (PRMs), or partitioning modifier in the capsule slurry, and/or encapsulated within the delivery agent encapsulates, Gas Chromatography with Mass Spectroscopy/Flame Ionization Detector (GC-MS/FID) is employed. Suitable equipment includes: Agilent Technologies G1530A GC/FID; Hewlett Packer Mass Selective Device 5973; and 5%-Phenyl-methylpoly siloxane Column J&W DB-5 (30 m length×0.25 mm internal diameter×0.25 μm film thickness). Approximately 3 g of the finished product or suspension of delivery encapsulates, is weighed and the weight recorded, then the sample is diluted with 30 mL of DI water and filtered through a 5.0 μm pore size nitrocellulose filter membrane. Material captured on the filter is solubilized in 5 mL of ISTD solution (25.0 mg/L tetradecane in anhydrous alcohol) and heated at 60° C. for 30 minutes. The cooled solution is filtered through 0.45 μm pore size PTFE syringe filter and analyzed via GC-MS/FID. Three known perfume oils are used as comparison reference standards. Data Analysis involves summing the total area counts minus the ISTD area counts and calculating an average Response Factor (RF) for the 3 standard perfumes. Then the Response Factor and total area counts for the product encapsulated perfumes are used along with the weight of the sample, to determine the total weight percent for each PRM in the encapsulated perfume. PRMs are identified from the mass spectrometry peaks.

B. Amount of Non-Encapsulated Material

In order to determine the amount of non-encapsulated perfume and (optionally) partitioning modifier material in a composition such as a slurry, the following equipment can be used for this analysis, using the analysis procedure provided after the table.

| | |
|---|---|
| Gas chromatograph/MS | Agilent GC6890 equipped with Agilent 5973N mass spectrometer or equivalent, capillary column operation, quantiation based on extracted ion capability, autosampler |
| Column for GC-MS | 30 m × 0.25 mm nominal diameter, 0.25 μm film thickness, J&W 122-5532 DB-5, or equivalent. |

To prepare a perfume standard in ISS Hexane, weigh 0.050+/−0.005 g of the desired PMC perfume oil into a 50 mL volumetric flask (or other volumetric size recalculating g of perfume oil to add). Fill to line with ISS Hexane solution from above. The ISS Hexane is a 0.1 g of Tetradecane in 4 liters of hexane.

To prepare a 5% surfactant solution, weigh 50 g+/−1 g of the sodium dodecyl sulphate in a beaker and, using purified water, transfer quantitatively to a 1 liter volumetric flask, and ensure the surfactant is fully dissolved.

To prepare the sample of the PMC composition (e.g., a slurry), confirm the composition (e.g., a slurry) is well-mixed; mix if necessary. Weigh 0.3+/−0.05 g of composition sample onto the bottom of a 10 mL vial. Avoid composition on the wall of the vial.

To operate the instrument, determine a target ion for quantification for each PRM (and optionally partitioning modifier) along with a minimum of one qualifier ion, preferably two. Calibration curves are generated from the Perfume standard for each PRM. Utilizing the sample weight and individual PRM weight %, the integration of the extracted ion (EIC) for each PRM and the amount are plotted or recorded.

The amount of free oil is determined from the response of each PRM versus the calibration curve and summed over all the different perfume materials and optionally the partitioning modifier.

C. Determination of Encapsulated Material

The determination of the encapsulated oil and optionally the partitioning modifier is done by the subtraction of the weight of free/non-encapsulated oil found in the composition from the amount by weight of total oil found in the composition (e.g. a slurry).

Analytical Determination of Wall Materials

This method determines the amount of wall material. First, the wall material of particles with size larger than 0.45 micrometer are isolated via dead-end filtration. Subsequent analysis by thermogravimetric analysis allows for elimination of inorganic material and other (organic) raw material slurry ingredients.

A. Sample Preparation

The procedure applies dead-end filtration to eliminate soluble fractions of the sample. Different solvents in succession are used to maximize the removal of interfering substances prior to TGA analysis.

The following materials and/or equipment are used:

Filtration Equipment

- Vacuum pump: Millipore Model WP6122050 or equivalent.

Thick walled vacuum tubing to connect pump with filtration device.

Filtrations flasks 500 or 1000 ml.

Filtration cup: e.g. 250 ml Millipore Filtration funnel ("Milli Cup"), filtration material: 0.45 micrometer membrane, solvent resistant.

Sealable Plastic container to contain the filtration device while weighing.

Standard laboratory glassware (glass beakers 100-250 ml, measuring cylinders 50-250 ml).

Drying Equipment

Vacuum oven and vacuum pump (settings 60-70 C/vacuum: 30-inch Mercury vacuum).

Desiccator or constant humidity chamber (keeping residues under controlled environment during cooling.

Solvents

All solvents: Analytical Grade minimum: 2-Propanol, Acetone, Chloroform

The filtration procedure is as follows: To prepare the filtration device, record the weight of a pre-dried filtration device (e.g. Milli cup filter) down to 0.1-0.2 mg. Pre-drying involves the same drying steps as done for the filter after filtration is completed.

Filter the sample by weighing between 1 and 2 grams of Slurry Raw Material (note weight down to 0.1-0.2 mg) into a glass beaker (250 ml), or directly into the filtration device. Add 20 ml of deionized water and swirl to homogenize the sample. Add 80 ml of isopropylalcohol and homogenize sample with solvent; use heating to flocculate the sample. Put the filtration device onto a filtration bottle, and start up filtration with vacuum. After filtration is complete, add 100 ml Chloroform. Continue filtration. Add 10-20 ml Acetone and filter through the membrane to remove traces of chloroform. Remove the filter from the filtration system and dry it in a vacuum oven. After cooling, weigh the filter and record the weight.

Calculate the percent residue (gravimetric residue) by dividing the weight difference of Filter+Residue and Filter weight only (=net weight of residue after filtration) by the Raw Material Slurry sample weight and multiply by 100 to obtain % units. Continue with the measurement of % Residue via TGA analysis.

Thermo Gravimetric Analysis (TGA) is performed with the following equipment and settings: TGA: TA instruments Discovery TGA; Pans: Sealed Aluminum; Purge: N2 at 50 ml/min; Procedure: Ramp 10° C./min to 500° C.; TGA is coupled to a Nicolet *Nexus* 470 FTIR spectrometer for evolved gas.

For TGA data analysis, the weight loss between 350 and 500° C. is due to decomposition of polymer wall material of the perfume micro capsules and still residual (burned) perfume compounds. For calculation of insoluble polymer fraction this weight loss is used. At 500° C. there is still a residue which is un-burned material and should be considered when calculating the insoluble polymer fraction.

Analytical Determination of the Core:Wall Ratio

When the amount of core and wall material inputs are not readily available, the core:wall ratio of the encapsulates may be determined analytically using the methods described herein.

More specifically, the methods above allow determination (in weight) the amounts of perfume, partitioning modifier, and wall materials in the perfume capsule composition (e.g., a slurry) and can be used to calculate the core:wall ratio. This is done by dividing the total amount (by weight) of perfume plus partitioning modifier found in the composition divided by the amount (by weight) of cross-linked wall material found in the composition.

Test Method for Determining log P

The value of the log of the Octanol/Water Partition Coefficient (log P) is computed for each PRM in the perfume mixture being tested. The log P of an individual PRM is calculated using the Consensus log P Computational Model, version 14.02 (Linux) available from Advanced Chemistry Development Inc. (ACD/Labs) (Toronto, Canada) to provide the unitless log P value. The ACD/Labs' Consensus log P Computational Model is part of the ACD/Labs model suite.

Volume-Weighted Particle Size and Size Distribution

The volume-weighted particle size distribution is determined via single-particle optical sensing (SPOS), also called optical particle counting (OPC), using the AccuSizer 780 AD instrument and the accompanying software CW788 version 1.82 (Particle Sizing Systems, Santa Barbara, Calif., U.S.A.), or equivalent. The instrument is configured with the following conditions and selections: Flow Rate=1 ml/sec; Lower Size Threshold=0.50 μm; Sensor Model Number=Sensor Model Number=LE400-05 or equivalent; Autodilution=On; Collection time=60 sec; Number channels=512; Vessel fluid volume=50 ml; Max coincidence=9200. The measurement is initiated by putting the sensor into a cold state by flushing with water until background counts are less than 100. A sample of delivery capsules in suspension is introduced, and its density of capsules adjusted with DI water as necessary via autodilution to result in capsule counts of at least 9200 per ml. During a time period of 60 seconds the suspension is analyzed. The resulting volume-weighted PSD data are plotted and recorded, and the values of the desired volume-weighted particle size (e.g., the median/50$^{th}$ percentile, 5$^{th}$ percentile, and/or 90$^{th}$ percentile) are determined.

The broadness index can be calculated by determining the delivery particle size at which 90% of the cumulative particle volume is exceeded (90% size), the particle size at which 5% of the cumulative particle volume is exceeded (5% size), and the median volume-weighted particle size (50% size: 50% of the particle volume both above and below this size).

$$\text{Broadness Index}=((90\%\text{ size})-(5\%\text{ size}))/50\%\text{ size}.$$

Fracture Strength Test Method

To measure average Fracture Strength for the population, and/or determine Delta Fracture Strength, three different measurements are made: i) the volume-weighted capsule size distribution; ii) the diameter of 10 individual capsules within each of 3 specified size ranges (and/or 30 individual capsules at the median volume-weighted particle size, if average Fracture Strength is to be determined), and; iii) the rupture-force of those same 30 individual capsules.

a.) The volume-weighted capsule size distribution is determined as described above. The resulting volume-weighted PSD data are plotted and recorded, and the values of the median, 5$^{th}$ percentile, and 90$^{th}$ percentile are determined.

b.) The diameter and the rupture-force value (also known as the bursting-force value) of individual capsules are measured via a custom computer-controlled micromanipulation instrument system which possesses lenses and cameras able to image the delivery capsules, and which possess a fine, flat-ended probe connected to a force-transducer (such as the Model 403A available from Aurora Scientific Inc, Canada) or equivalent, as described in: Zhang, Z. et al. (1999) "Mechanical strength of single microcapsules determined by a novel micromanipulation technique." J. Microencapsulation, vol 16, no. 1, pages 117-124, and in: Sun, G. and Zhang, Z. (2001) "Mechanical Properties of Melamine-Formaldehyde microcapsules." J. Microencapsulation, vol 18, no. 5, pages 593-602, and as available at the University of Birmingham, Edgbaston, Birmingham, UK.

c.) A drop of the delivery capsule suspension is placed onto a glass microscope slide, and dried under ambient conditions for several minutes to remove the water and achieve a sparse, single layer of solitary capsules on the dry slide. Adjust the concentration of capsules in the suspension as needed to achieve a suitable capsule density on the slide. More than one slide preparation may be needed.

d.) The slide is then placed on a sample-holding stage of the micromanipulation instrument. Thirty benefit delivery capsules on the slide(s) are selected for measurement, such that there are ten capsules selected within each of three pre-determined size bands. Each size band refers to the diameter of the capsules as derived from the Accusizer-generated volume-weighted PSD. The three size bands of capsules are: the Median/50$^{th}$ Percentile Diameter+/−2 μm; the 5$^{th}$ Percentile Diameter+/−2 μm; and the 90$^{th}$ Percentile Diameter+/−2 μm. Capsules which appear deflated, leaking or damaged are excluded from the selection process and are not measured.

i. If enough capsules are not available at a particular size band+/−2 μm, then the size band may be increased to +/−5 μm.

ii. If average Fracture Strength for the population is to be determined, then 30 (or more) capsules at the median/50$^{th}$ Percentile size band may be measured.

e.) For each of the 30 selected capsules, the diameter of the capsule is measured from the image on the micromanipulator and recorded. That same capsule is then compressed between two flat surfaces, namely the flat-ended force probe and the glass microscope slide, at a speed of 2 μm per second, until the capsule is ruptured. During the compression step, the probe force is continuously measured and recorded by the data acquisition system of the micromanipulation instrument.

f) The cross-sectional area is calculated for each of the selected capsules, using the diameter measured and assuming a spherical capsule ($\pi r^2$, where r is the radius of the capsule before compression). The rupture force is determined for each selected capsule from the recorded force probe measurements, as demonstrated in Zhang, Z. et al. (1999) "Mechanical strength of single microcapsules determined by a novel micromanipulation technique." *J. Microencapsulation*, vol 16, no. 1, pages 117-124, and in: Sun, G. and Zhang, Z. (2001) "Mechanical Properties of Melamine-Formaldehyde microcapsules." *J. Microencapsulation*, vol 18, no. 5, pages 593-602.

g.) The Fracture Strength of each of the 30 capsules is calculated by dividing the rupture force (in Newtons) by the calculated cross-sectional area of the respective capsule.

h.) Calculations:

Average Fracture Strength for the population is determined by averaging the Fracture Strength values of (at least) thirty capsules at the Median/50$^{th}$ Percentile size band.

The Delta Fracture Strength is calculated as follows:

$$\text{Delta Fracture Strength}(\%) = \frac{FS@d_5 - FS@d_{90}}{FS@d_{50}} * 100$$

where FS at $d_i$ is the FS of the capsules at the percentile i of the volume-weighted size distribution.

EXAMPLES

The examples provided below are intended to be illustrative in nature and are not intended to be limiting.

Example 1. Exemplary Synthesis of Delivery Particles and Related Calculations An exemplary synthesis process for a population of delivery particles is provided below. Details for the materials used are provided in Table 1A.

TABLE 1A

| Name (function) | Company/City | Chemical Description |
|---|---|---|
| CN975 (monomer) | Sartomer Company, Exton, PA | hexafunctional urethane acrylate ester |
| CD9055 (monomer) | Sartomer Company, Exton, PA | acid acrylate |
| TBAEMA (monomer) | NovaSol North America Inc., Stoney Creek, ON, Canada | 2-(tert-butylamino) ethyl methacrylate |
| Vazo 67 (initiator) | Chemours Company, Wilmington, DE | 2,2'-azobis (2-methylbutyronitrile) |
| V-501 (initiator) | Sigma-Aldrich Corp., St. Louis, MO | 4,4'-azobis(4-cyanovaleric acid) |

A. Synthesis Process Description (36 Micron Capsules, 98:2 Core-to-Wall Wt. Ratio, Approx. 24% Initiator Level)

To a 1 L capacity water jacketed stainless steel reactor, 107.3 grams of perfume oil and 103.0 grams of isopropyl myristate are added and allowed to mix with the aid of a high shear mixer fitted with a mill blade, under a nitrogen environment. The solution is heated to 35 C before introducing 0.76 grams of Vazo67 (initiator) and the total mixture is subsequently heated to 70 C and is maintained at that temperature for 45 minutes before cooling the system down to 50 C. As soon as the temperature is reached, a solution, prepared separately, containing 47.3 grams of perfume oil, 0.06 grams of CD9055, 0.06 grams of TBAEMA, and 3.96 grams of CN975 is introduced into the reactor and the total mixture is allowed to mix for 10 min while at 50 C. The water phase, consisting of 80.2 grams of emulsifier (5% solution of PVOH 540), 255.0 grams of RO water, 0.51 grams of V-501, and 0.51 grams of NaOH (21% solution) is then added to the reactor, after stopping agitation. Milling ensues after the addition of the water phase until the particle size is reached (target=36 microns). The emulsion is then heated first to 75 C and maintained at that temperature for 240 minutes and then heated to 95 C for 360 min before cooling it down to 25 C. At that point, the slurry is evacuated from the reactor into a container to add the rheology modifier (Xanthan gum 1.19 grams) and preservative (Acticide BWS-10; 0.45 grams). The rheology modifier is allowed to mix in for 30 min. The preservative is added last and allowed to mix for 5-10 min. The finished slurry is then characterized and tested as deemed fit.

B. Sample Calculation—Core:Wall Weight Ratio of the Capsules of Part A

The core:wall weight ratio is determined by dividing the weight of the total core material inputs (e.g., perfume oil and partitioning modifier) by the weight of the total wall material inputs (e.g., wall monomers and initiators). Alternatively, the relative percentage of core material in the particle population can be determined by dividing the weight of the total core material inputs by the sum of the total weight of the core material inputs plus the total weight of the wall material inputs and multiplying by 100; the remaining percentage (100-% core) is the relative percentage of the wall material—these numbers may then be expressed as a ratio. Similarly, the relative percentage of wall material in the particle population can be determined by dividing the total weight of the wall material inputs by the sum of the weights of the total core material inputs and the total wall material inputs and multiplying by 100.

A sample calculation for the "98:2" capsules formed by the example of this section is provided below, where the core comprises the perfume oil and a partitioning modifier (isopropyl myristate), and the wall comprises the wall monomers (CN975, CD9055, and TBAEMA) and the initiators (Vazo67 and V-501).

$$\%\text{ core} = \frac{(\text{perfume oil} + \text{partitioning modifier})}{(\text{perfume oil} + \text{partitioning modifier} + \text{wall monomers} + \text{initiatiors})} \times 100$$

$$\%\text{ core} = \frac{((107.3 + 47.3\text{g}) + 103.0\text{g})}{((107.3 + 47.3\text{g}) + 103.0\text{g} + (0.06\text{g} + 0.06\text{g} + 3.96\text{g}) + (0.76\text{g} + 0.51\text{g}))} \times 100$$

$$\%\text{ core} = \frac{257.6\text{g}}{262.95\text{g}} \times 100 = 97.97\%\text{ core material (and 2.03\% wall material)}$$

C. Sample Calculation—Initiator Level of the Capsules of Part A

The amount of free radical initiator in the capsule wall, expressed as a weight percentage of the wall, is determined by dividing the total amount of initiator by wall materials, namely the wall monomers and the initiators. As sample calculation for the capsules formed by the example of this section is provided below.

$$\%\text{ initiator} = \frac{(\text{total initiators})}{(\text{wall monomers} + \text{initiators})} \times 100$$

$$\%\text{ initiator} = \frac{(0.76\text{g} + 0.51\text{g})}{((0.06\text{g} + 0.06\text{g} + 3.96\text{g}) + (0.76\text{g} + 0.51\text{g}))} \times 100$$

$$\%\text{ initiator} = \frac{1.27\text{g}}{5.35\text{g}} \times 100 = 23.7\%\text{ initiator}$$

D. Additional Delivery Particle Populations

Other populations of delivery particles can be made substantially according to the process described in Part A of this example, but by varying the amount of the inputs. For example, comparative and inventive delivery particle populations can be made according to the process substantially as described in Part A, but with inputs according to the following table. For convenience, the inputs of the particle population of Part A is also provided below in Table 1B. Population B is a comparative population, as the initiator level is about 8.9%, by weight of the wall polymer.

TABLE 1B

| Input | Population A (as described in Part A) | Population B (comparative population) | Population C |
|---|---|---|---|
| Perfume input 1 | 107.3 g | 107.0 g | 107.2 g |
| Partitioning modifier (isopropyl myristate) | 103.0 g | 102.6 g | 103.0 g |
| Initiator 1 (Vazo67) | 0.76 g | 0.32 g | 1.25 g |
| Perfume input 2 | 47.3 g | 47.29 g | 47.2 g |
| CD9055 | 0.06 g | 0.07 | 0.06 |
| TBAEMA | 0.06 g | 0.07 | 0.06 |
| CN975 | 3.96 g | 5.5 g | 2.4 g |
| Initiator 2 (V-501) | 0.51 g | 0.23 g | 1.51 g |
| % initiator (by wt. of wall) | 23.7% | 8.9% | 52.3% |
| Core % (by wt. of particles) | 97.97% | 97.65% | 97.99% |
| Wall % (by wt. of particles) | 2.03% | 2.35% | 2.01% |
| Perfume % (by wt. of core) | 60.02% | 60.06% | 59.98% |

Example 2. Initiator Level and Benefit Agent Leakage

To test the effect that the level of free radical initiator has on benefit agent leakage, several populations of polyacrylate-walled delivery particles are made, generally according to Example 1 above. The particles have a core:wall weight ratio of 97.5:0.5 and use the same wall materials. However, for at least some of the populations, the level of free radical initiator is varied as provided in Table 2. Additionally, a comparative population of 90:10 core:wall delivery particles is provided. The particles are made to have a target average particle size of about 38 microns (±4 microns).

In Table 2, the initiator levels are provided as a weight percentage, by weight of the polymer wall (e.g., wall monomers+free radical initiators). The relative initiator amounts are based on the initiator level of the 90:10 comparative delivery particles (e.g., "1×"). The 97.5:2.5 delivery particles in Leg 2 are characterized by the same "1×" initiator level, as the initiator % level is the same, even though the amount of total wall material relative to the core material is less. If two times the amount of initiator were to be used, the relative initiator level would be "2×," and so on.

The cores of each populations include the same fragrance material and a partitioning modifier (isopropyl myristate), present in a 60:40 weight ratio. The fragrance material includes about 9.6% of aldehyde-containing perfume raw materials and about 5.7% of ketone-containing perfume raw materials.

The populations of delivery particles are provided to a heavy duty liquid (HDL) laundry detergent and are stored for one week at 35° C. At the end of the storage period, the products are tested for perfume leakage with respect to particular perfume raw materials from the delivery particles according to the test methods provided above. The results are provided below in Table 2. The amount of particle leakage is presented as a percentage of the selected PRMs that were initially encapsulated.

TABLE 2

| Leg | Core:Wall Wt. Ratio | Initiator 1 [a] (wt. %) | Initiator 2 [b] (wt. %) | Total Initiator (wt. %) | Relative Initiator Amt. | Leakage in HDL (%) |
|---|---|---|---|---|---|---|
| 1 (comp.) | 90:10 | 4.8 | 5.8 | 10.6 | 1X (base-line) | 12.3 |

TABLE 2-continued

| Leg | Core:Wall Wt. Ratio | Initiator 1 [a] (wt. %) | Initiator 2 [b] (wt. %) | Total Initiator (wt. %) | Relative Initiator Amt. | Leakage in HDL (%) |
|---|---|---|---|---|---|---|
| 2 (comp.) | 97.5:2.5 | 4.8 | 3.6 | 8.4 | 0.8X | 23.8 [c] |
| 3 | 97.5:2.5 | 24.0 | 16.0 | 40.0 | 3.8X | 16.3 |
| 4 | 97.5:2.5 | 28.8 | 19.2 | 48.0 | 4.5X | 12.0 |

[a] Initiator 1 = Vazo 67
[b] Initiator 2 = V-501
[c] Average leakage across three trials As shown in Table 2, delivery particles having a 90:10 core:wall weight ratio and a "1×" initiator level exhibit relatively low leakage upon storage in an HDL laundry detergent. However, these particles are characterized by relatively low loading capacity.

Using a similar initiator level (here, 0.8×) in delivery particles with a 97.5:2.5 core:wall weight ratio results in relatively higher leakage (e.g., above 20%), which will likely lead to suboptimal performance in normal usage conditions.

According to the results in Table 2, increasing the relative amount of free radical initiator results in particles showing relatively lower leakage (e.g., less than 20%). To note, the leakage rates are reasonably close to those of the comparative 90:10 capsules of Leg 1, even though the capsules of Legs 3 and 4 use relatively less wall material.

Example 3. Initiator Levels (Core:Wall Ratios of 90:10 vs. 98:2

To test the effect that the level of free radical initiator has on encapsulation and performance, several populations of polyacrylate-walled delivery particles are made, generally according to Example 1 above. The encapsulated perfume includes about 17% of aldehydic perfume raw materials and about 0.2% of PRMs that include ketone functionality.

Core:wall weight ratios and free radical initiator levels for the different test legs are provided in Table 3 below. The delivery particles are produced on a production scale of approximately 3 kg.

TABLE 3

| Leg | Core:Wall Wt. Ratio | Free Radical Initiator [1] (as % of polymer wall) | Free Perfume Oil (as % of total fragrance material available for encapsulation) | % leakage 1 wk 35 C. HDL | Relative Monomer Usage (ranking; 1 = best) |
|---|---|---|---|---|---|
| 1 (comp) | 90:10 | 10.6% | 0.08 | 6.15 | Good (not ranked) |
| 2 (comp) | 98:2 | 8.0% | 0.23 | 22.08 | Poor (2) |
| 3 (inv) | 98:2 | 32.3% | 0.32 | 18.45 | Good (1) |

As shown in Table 3, delivery particles having a core:wall weight ratio of 90:10 are characterized by good encapsulation and performance, even if the level of initiator is relatively low (Leg 1). However, the same relative amount of initiator leads to poorer capsules when the core:wall ratio is increased to 98:2 (Leg 2). However, increasing the relative amount of initiator level can improve performance in such capsules (Leg 3).

Example 4. Initiator Levels

To test the effect that the level of free radical initiator has on encapsulation, several populations of polyacrylate-walled delivery particles are made, generally according to Example 1 above. The encapsulated perfume includes about 30% of aldehydic perfume raw materials and about 4.2% of PRMs that include ketone functionality.

Core:wall weight ratios and free radical initiator levels for the different test legs are provided in Table 3 below. The delivery particles are produced on a production scale of approximately 3 kg.

TABLE 4

| Leg | Core:Wall Wt. Ratio | Free Radical Initiator [1] (as % of polymer wall) | Relative Monomer Usage (ranking; 1 = best) |
|---|---|---|---|
| 1 (comp) | 98:2 | 8.0% | 4 |
| 2 (inv) | 98:2 | 16.2% | 3 |
| 3 (inv) | 98:2 | 24.2% | 2 |
| 4 (inv) | 98:2 | 32.3% | 1 |

As shown in Table 4, relatively higher levels of free radical initiator in delivery particles having a high core:wall weight ratio (e.g., 98:2) show improved relative usage of the wall monomers. That being said, it is Applicant's experience that efficiency of perfume encapsulation and/or leakage in final products can sometimes be negatively impacted when initiator levels are too high.

Initiator is added prior to emulsification, and an additional aliquot can be added subsequent to emulsification. Compared to a baseline of 1× to 3× of the amount of initiator, it was found that an optional further portion of initiator addition (1× to 9×) in a further step during the encapsulation process can result in an even more robust wall and further reduce leakage. It is envisioned the further portion in the additional addition step can be added in one or more further addition steps. It was surprising when observed that the population of delivery particles overall performance in fact can be enhanced when initiator is added in multiple steps with a portion added even after emulsification.

Example 5. Initiator Level and Fracture Strength

To test the effect of initiator level on particle fracture strength, several populations of polyacrylate-walled delivery particles are made, generally according to Example 1 above. The particles have a core:wall weight ratio of 98:2 and use the same wall materials. However, for at least some of the populations, the level of free radical initiator is varied as provided in Table 5A. Additionally, a comparative population of 90:10 core:wall delivery particles are provided. The particles are made to have a target average particle size of about 36 microns (±3 microns).

In Table 5A, the initiator levels are provided as a weight percentage, by weight of the polymer wall (e.g., wall monomers+free radical initiators). As in the previous example, the relative initiator amounts are based on the initiator level of the 90:10 comparative delivery particles (e.g., "1×").

The cores of each populations include the same fragrance material and a partitioning modifier (isopropyl myristate), present in a 60:40 weight ratio. The fragrance material includes about 9.6% of aldehyde-containing perfume raw materials and about 5.7% of ketone-containing perfume raw materials.

TABLE 5A

| Leg | Core:Wall Wt. Ratio | Initiator 1 [a] (wt. %) | Initiator 2 [b] (wt. %) | Total Initiator (wt. %) | Relative Initiator Amt. |
|---|---|---|---|---|---|
| 1 (comp.) | 90:10 | 4.8 | 5.8 | 10.6 | 1X (baseline) |
| 2 (comp.) | 98:2 | 4.8 | 3.2 | 8.0 | 0.75X |
| 3 | 98:2 | 14.4 | 9.6 | 24 | 2.3X |
| 4 | 98:2 | 24 | 29 | 53 | 5.0X |

[a] Initiator 1 = Vazo 67
[b] Initiator 2 = V-501

Each population from Table 5A is analyzed for particle size (Ps, in microns) and Fracture Strength (FS, in MPa) according to the test methods provided above. Measurements are determined at different points in the particle size distribution (at 5%, 50%, and 90%) for each population. Results are provided in Table 5B.

TABLE 5B

| Leg | C:W wt. ratio (relative initiator level) | Characteristic | @ $d_5$ | @ $d_{50}$ | @ $d_{90}$ |
|---|---|---|---|---|---|
| 1 | 90:10 (1X) | Ps (μm) | 9.2 | 36.1 | 50.1 |
| (comp.) | | FS (MPa) | 6.2 | 0.8 | 0.6 |
| 2 | 98:2 (0.75X) | Ps (μm) | 10.9 | 34.9 | 50.6 |
| (comp.) | | FS (MPa) | 2.65 | 1.23 | 0.93 |
| 3 | 98:2 (2.3X) | Ps (μm) | 11.2 | 38.5 | 51.6 |
| | | FS (MPa) | 1.66 | 1.31 | 1.18 |
| 4 | 98:2 (5.0X) | Ps (μm) | 12.2 | 37.4 | 50.8 |
| | | FS (MPa) | 0.91 | 0.37 | 0.30 |

First, the data in Table 5B shows that the 90:10 particles of Leg 1 have a wide range of Fracture Strength values from particle size d5 to d90. This indicates that the population's particles will rupture under different circumstances, which may lead to inconsistent performance. Further, the particles of Leg 1 have suboptimal loading capacity.

Next, the data in Table 5B shows that the 98:2 particles of Leg 3 demonstrate relatively consistent Fracture Strength across the population's particle size distribution. Further, the Fracture Strength of Leg 3 is consistently between 1 MPa and 2 MPa across the size distribution (FS of 1.66, 1.31, 1.18 MPa), which is believed to be a desirable FS range for freshness performance in consumer good compositions, for example, in fabric care compositions.

Contrast the range and magnitude of the measurements of the particles of Leg 3 with those of the particles of Leg 2, which are made with relatively less free radical initiator (FS from 2.65 to 0.93 MPa), and those of the particles of Leg 4, which are made with relatively more free radical initiator (FS from 0.91 to 0.30 MPa).

In particular, it is believed that the particle population of Leg 4, which consistently exhibits Fracture Strengths below 1.0 MPa, is less preferred for use in many consumer goods applications as they are relatively brittle and appear likely to rupture prior to an intended touchpoint.

Example 6. Exemplary Formulations—Liquid Fabric Enhancers

Table 6 shows exemplary formulations of compositions according to the present disclosure. Specifically, the following compositions are liquid fabric enhancer products.

TABLE 6

| | % Active (w/w) | | |
|---|---|---|---|
| Ingredient | Composition 1 | Composition 2 | Composition 3 |
| Quaternary ammonium ester material | 5% (Ester Quat 1)[1] | 7% (Ester Quat 2)[2] | 8% (Ester Quat 3)[3] |
| Delivery Particles* (w/encapsulated fragrance) | 0.25% | 0.25% | 0.25% |
| Formic Acid | 0.045% | 0.045% | 0% |
| Hydrochloric acid | 0.01% | 0% | 0% |
| Preservative | 0.0045% | 0% | 0% |
| Chelant | 0.0071% | 0.0071% | 0% |
| Structurant | 0.10% | 0.30% | 0.1% |
| Antifoam | 0.008% | 0.00% | 0% |
| Water | Balance | Balance | Balance |

[1]Ester Quat 1: Mixture of bis-(2-hydroxypropyl)-dimethylammonium methylsulfate fatty acid ester, (2-hydroxypropyl)-(1-methyl-2-hydroxyethyl)-dimethylammonium methylsulfate fatty acid ester, and bis-(1-methyl-2-hydroxyethyl)-dimethylammonium methylsulfate fatty acid ester, where the fatty acid esters are produced from a C12-C18 fatty acid mixture (REWOQUAT DIP V 20 M Conc, ex Evonik)
[2]Ester Quat 2: N,N-bis(hydroxyethyl)-N,N-dimethyl ammonium chloride fatty acid ester, produced from C12-C18 fatty acid mixture (REWOQUAT CI-DEEDMAC, ex Evonik)
[3]Ester Quat 3: Esterification product of fatty acids (C16-18 and C18 unsaturated) with triethanolamine, quaternized with dimethyl sulphate (REWOQUAT WE 18, ex Evonik)
*Delivery particles according to the present disclosure, i.e., the population formed in Example 1 above.. The "% Active" provided is the amount of fragrance delivered to the composition.

Example 7. Exemplary Formulations—Laundry Additive Particles

Table 7 shows exemplary formulations of compositions according to the present disclosure. Specifically, the following compositions are laundry additive particles in the form of a pastille or "bead," for example commercially available products sold as DOWNY UNSTOPABLES™ (ex The Procter & Gamble Company).

TABLE 7

| Ingredient | Ex. 1 | Ex. 2 | Ex. 3 | Ex. 4 | Ex. 5 | Ex. 6 |
|---|---|---|---|---|---|---|
| Polyethylene Glycol MW 8000 [1] | 64% | 65% | 63% | 83.5% | 81.5% | 61% |
| Ester Quat [2] | 25% | 27% | 25% | — | — | 24% |
| CatHEC [3] | 3% | 3% | — | — | — | — |
| Perfume | — | — | — | 10.3% | 13.3% | 5% |
| Delivery Particles Slurry [4] | 8% | 4% | 12% | 5% | 5.2% | 10% |

[1] PLURIOL E8000 (ex BASF)
[2] Esterification product of fatty acids (C16-18 and C18 unsaturated) with triethanolamine, quaternized with dimethyl sulphate (REWOQUAT WE 18, ex Evonik)
[3] Cationically-modified hydroxyethylcellulose
[4] Fragrance delivery particles according to the present disclosure, i.e., the population formed in Example 1 above. The % provided is the amount of aqueous slurry provided to the composition, where the slurry comprises about 45 wt % of delivery particles (core + shell).

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A consumer product composition comprising:

a population of delivery particles, wherein the delivery particles comprise a core and a polymer wall surrounding the core, wherein the polymer wall comprises a (meth)acrylate polymer derived, at least in part, from wall monomers and at least one free radical initiator, wherein the wall monomers comprise at least 50%, by weight of the wall monomers, of (meth)acrylate monomers, wherein the at least one free radical initiator is present at a level of from 20% to 50%, by weight of the polymer wall, wherein the core comprises a benefit agent, wherein the core and the polymer wall are present in a weight ratio of from 96:4 to 99:1; and a consumer product adjunct material.

2. The consumer product composition according to claim 1, wherein the wall monomers comprise at least 60%, by weight of the wall monomers, of (meth)acrylate monomers.

3. The consumer product composition according to claim 1, wherein the (meth)acrylate monomers are multifunctional (meth)acrylate monomers, having at least three radical polymerizable functional groups, with the proviso that at least one of the radical polymerizable groups is acrylate or methacrylate.

4. The consumer product composition according to claim 1, wherein the at least one free radical initiator comprises a first free radical initiator and a second free radical initiator.

5. The consumer product composition according to claim 4, wherein the first free radical initiator and the second free radical initiator are present in a weight ratio of from about 5:1 to about 1:5.

6. The consumer product composition according to claim 1, wherein the at least one free radical initiator comprises a comprises a water-soluble or water-dispersible free radical initiator.

7. The consumer product composition according to claim 1, wherein the at least one free radical initiator comprises a material selected from the group consisting of peroxy initiators, azo initiators, and combinations thereof.

8. The consumer product composition according claim 7, wherein the at least one free radical initiator comprises a material selected from the group consisting of: peroxide; dialkyl peroxide; alkylperoxide; peroxyester; peroxycarbonate; peroxyketone; peroxydicarbonate; 2,2'-azobis (isobutylnitrile); 2,2'-azobis (2,4-dimethylpentanenitrile); 2,2'-azobis (2,4-dimethylvaleronitrile); 2,2'-azobis (2-methylpropanenitrile); 2,2'-azobis (2-methylbutyronitrile); 1,1'-azobis (cyclohexanecarbonitrile); 1,l'-azobis (cyanocyclohexane); benzoyl peroxide; decanoyl peroxide; lauroyl peroxide; di(n-propyl) peroxydicarbonate; di(sec-butyl) peroxydicarbonate; di(2-ethylhexyl) peroxydicarbonate; 1,1-dimethyl-3-hydroxybutyl peroxyneodecanoate; a-cumyl peroxyneoheptanoate; t-amyl peroxyneodecanoate; t-butyl peroxyneodecanoate; t-amyl peroxypivalate; t-butyl peroxypivalate; 2,5-dimethyl 2,5-di(2-ethylhexanoyl peroxy) hexane; t-amyl peroxy-2-ethyl-hexanoate; t-butyl peroxy-2-ethylhexanoate; t-butyl peroxyacetate; di-t-amyl peroxyacetate; t-butyl peroxide; di-t-amyl peroxide; 2,5-dimethyl-2, 5-di-(t-butylperoxy) hexyne-3; cumene hydroperoxide; 1,1-di-(t-butylperoxy)-3,3,5-trimethyl-cyclohexane; 1,1-di-(t-butylperoxy)-cyclohexane; 1,1-di-(t-amylperoxy)-cyclohexane; ethyl-3,3-di-(t-butylperoxy)-butyrate; t-amyl perbenzoate; t-butyl perbenzoate; ethyl 3,3-di-(t-amylperoxy)-butyrate; and combinations thereof.

9. The consumer product composition according to claim 1, wherein the at least one free radical initiator is present at a level of from 20% to 35%, by weight of the polymer wall.

10. The consumer product composition according to claim 1, wherein the core and the polymer wall are present in a weight ratio of from 97:3 to 99:1.

11. The consumer product composition according to claim 1, wherein the benefit agent comprises an aldehyde-comprising benefit agent, a ketone-comprising benefit agent, or a combination thereof.

12. The consumer product composition according to claim 1, wherein the benefit agent comprises fragrance.

13. The consumer product composition according to claim 1, wherein the core comprises a partitioning modifier.

14. The consumer product composition according to claim 1, wherein the polymer wall of the delivery particles further comprise a polymeric emulsifier entrapped in the polymer wall.

15. The consumer product composition according to claim 1, wherein the delivery particles are characterized by a volume-weighted median particle size from about 10 to about 100 microns.

16. The consumer product composition according to claim 1, wherein the consumer product adjunct material is selected from the group consisting of surfactants, conditioning actives, deposition aids, rheology modifiers or structurants, bleach systems, stabilizers, builders, chelating agents, dye transfer inhibiting agents, dispersants, enzymes, enzyme stabilizers, catalytic metal complexes, polymeric dispersing agents, clay and soil removal/anti-redeposition agents, brighteners, suds suppressors, silicones, hueing agents, aesthetic dyes, neat perfume, additional perfume delivery systems, structure elasticizing agents, carriers, hydrotropes, processing aids, anti-agglomeration agents, coatings, formaldehyde scavengers, pigments, and mixtures thereof.

17. The consumer product composition according to claim 1, wherein the composition is a fabric care composition, a hard surface cleaner composition, a dish care composition, a hair care composition, a body cleansing composition, or a mixture thereof.

18. The consumer product composition according to claim 1, wherein the composition is in the form of a liquid composition, a granular composition, a hydrocolloid, a single-compartment pouch, a multi-compartment pouch, a dissolvable sheet, a pastille or bead, a fibrous article, a tablet, a stick, a bar, a flake, a foam/mousse, a non-woven sheet, or a mixture thereof.

* * * * *